(12) United States Patent
Hill et al.

(10) Patent No.: US 9,460,410 B2
(45) Date of Patent: Oct. 4, 2016

(54) SYSTEMS, DEVICES AND METHODS FOR INTEGRATED DISPLAY AND MANAGEMENT OF TRANSPORTATION RESOURCES

(75) Inventors: Blake Hill, Bella Vista, AR (US); Ann Wilson, Springdale, AR (US); Nicole Liedka, Rogers, AR (US); James A. Hopkins, Bella Vista, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 75 days.

(21) Appl. No.: 13/287,970

(22) Filed: Nov. 2, 2011

(65) Prior Publication Data

US 2013/0110739 A1    May 2, 2013

(51) Int. Cl.
*G06Q 10/08* (2012.01)
*G06Q 10/06* (2012.01)

(52) U.S. Cl.
CPC ........ *G06Q 10/083* (2013.01); *G06Q 10/0631* (2013.01)

(58) Field of Classification Search
CPC .................. G06Q 10/06311; G06Q 10/0631; G06Q 10/083
USPC ........ 705/7.13, 7.25, 330, 333, 337
See application file for complete search history.

(56) References Cited

U.S. PATENT DOCUMENTS

| | | | | |
|---|---|---|---|---|
| 5,963,911 A * | 10/1999 | Walker | ............... | G06Q 10/0631 700/100 |
| 6,339,745 B1 * | 1/2002 | Novik | ........................... | 701/431 |
| 2002/0171650 A1 * | 11/2002 | Prabhakaran | ................. | 345/530 |
| 2003/0014286 A1 * | 1/2003 | Cappellini | ............. | G06Q 10/02 705/5 |
| 2004/0230601 A1 * | 11/2004 | Joao et al. | .................... | 707/102 |
| 2005/0021346 A1 * | 1/2005 | Nadan | .................... | G06Q 10/08 705/37 |
| 2005/0114189 A1 * | 5/2005 | Pandit | .............................. | 705/8 |
| 2005/0278063 A1 * | 12/2005 | Hersh | .............. | G06Q 10/06311 700/216 |
| 2007/0016363 A1 | 1/2007 | Huang et al. | | |
| 2007/0244677 A1 * | 10/2007 | Malitski | ............... | G06Q 10/047 703/6 |
| 2008/0167933 A1 * | 7/2008 | Hoffman et al. | ................. | 705/9 |
| 2009/0094084 A1 | 4/2009 | Rempel et al. | | |
| 2009/0254445 A1 * | 10/2009 | Bennett | .................. | G06Q 10/08 705/26.1 |
| 2010/0257015 A1 * | 10/2010 | Molander | ......................... | 705/9 |
| 2011/0300894 A1 * | 12/2011 | Roberts et al. | ............... | 455/521 |

FOREIGN PATENT DOCUMENTS

WO    99/06934 A1    2/1999

OTHER PUBLICATIONS

Chan, et al., A multiple-depot, multiple-vehicle, location routing problem with stochastically processed demands, Computers & Ops. Res., 2001, vol. 21 pp. 803-26.*

(Continued)

*Primary Examiner* — Daniel Vetter
(74) *Attorney, Agent, or Firm* — McCarter & English, LLP; David R. Burns

(57) ABSTRACT

Exemplary embodiments provide transportation management systems, devices and methods that allow display and management of transportation resources and operations in an integrated manner. Exemplary embodiments may provide, for example, a single dynamic and interactive interface for executing inbound transportation operations (procurement or pickup), outbound transportation operations (delivery or shipment), and operations in which multiple transportation resources are matched to one another.

45 Claims, 11 Drawing Sheets

(56) References Cited

OTHER PUBLICATIONS

Mahmassani, et al., Local Optimization Approaches to Solve Dynamic Commerical Fleet Management Problems, Transp. Res. Record, paper No. 00-1287, 2000, 1733, pp. 71-79.*

Extended European Search Report in European Application No. 12190949.3, dated Apr. 18, 2013.

Examination Report issued in European Patent Application No. 12190949.3, dated Jul. 4, 2016.

* cited by examiner class Load 900

Attributes 902

Identifier
Type
Size
Priority
AssignmentStatus
Vendor, if any
Location
Destination

Methods 904 getIdentifier; setIdentifier
getType; setType
getSize; setSize
getPriority; setPriority
getAssignmentStatus; setAssignmentStatus
getVendor; setVendor
getLocation; setLocation
getDestination; setDestination
renderLoad
startDrag
endDrag
matchLoadWithResource

*Figure 9*

SYSTEMS, DEVICES AND METHODS FOR INTEGRATED DISPLAY AND MANAGEMENT OF TRANSPORTATION RESOURCES

BACKGROUND

Transportation management systems allow management of inbound (pickup or procurement) and/or outbound (delivery or shipment) transportation operations. Certain conventional transportation systems utilize maps to display the geographical locations of mobile resources, e.g., trucks and/or trailers, but do not support direct user interaction with a single map to execute transportation operations in an integrated manner. As a result, these conventional transportation systems require the user to utilize additional interfaces, in addition to a map display of mobile transportation resources in order to execute transportation operations.

SUMMARY

Exemplary embodiments provide transportation management systems, devices and methods that allow management of transportation resources and execution of transportation operations in an integrated manner on a single interactive user interface. Exemplary embodiments may provide, for example, a single dynamic and interactive user interface that allows a user to define and execute one or more inbound transportation operations, one or more outbound transportation operations, and/or one or more matching operations in which two or more transportation resources are matched to one another.

In accordance with one exemplary embodiment, a computer-implemented method is provided for allowing management of transportation resources. The method includes rendering, using a computer, a map of a geographical region on a user interface. The method includes rendering, using the computer, representations of one or more available transportation resources on the map at representations of their current geographical locations, and rendering representations of one or more unassigned loads on the map at representations of their current geographical locations. The method includes receiving user input selecting, directly on the map, representations of a first set of one or more transportation resources and representations of a first set of one or more loads. The method also includes user input defining, directly on the user interface, a transportation operation in which the first set of transportation resources are assigned to transport the first set of loads from a geographical pickup location to a geographical destination location. The method includes executing code to perform the transportation operation based on the user input on the user interface.

In accordance with another exemplary embodiment, a computer system is provided for allowing management of transportation resources. The system includes a display device for displaying a user interface. The user interface renders a map of a geographical region, representations of a set of one or more available transportation resources rendered at representations of their current geographical locations, and representations of a set of one or more unassigned loads rendered at representations of their current geographical locations. The system also includes a processor programmed to receive user input selecting, directly on the map, representations of a first set of one or more transportation resources and representations of a first set of one or more loads. The processor is programmed to receive user input defining, directly on the user interface, a transportation operation in which the first set of transportation resources are assigned to transport the first set of loads from a geographical pickup location to a geographical destination location. The processor is also programmed to execute code to perform the transportation operation based on the user input on the user interface.

In accordance with another exemplary embodiment, one or more non-transitory computer-readable media storing computer-executable instructions are provided for performing a method for allowing management of transportation resources. The method includes rendering, using a computer, a map of a geographical region on a user interface. The method includes rendering, using the computer, representations of a set of one or more available transportation resources on the map at representations of their current geographical locations, and representations of a set of one or more unassigned loads rendered on the map at representations of their current geographical locations. The method includes receiving user input selecting, directly on the map, representations of a first set of one or more transportation resources and representations of a first set of one or more loads, and defining, directly on the user interface, a transportation operation in which the first set of transportation resources are assigned to transport the first set of loads from a geographical pickup location to a geographical destination location. The method includes executing code to perform the transportation operation based on the user input on the user interface.

BRIEF DESCRIPTION OF THE DRAWINGS

The foregoing and other objects, aspects, features and advantages of exemplary embodiments will be more fully understood from the following description when read together with the accompanying drawings, in which:

FIG. 9 is a block diagram of an exemplary class for representing loads.

DETAILED DESCRIPTION

Figure 1:
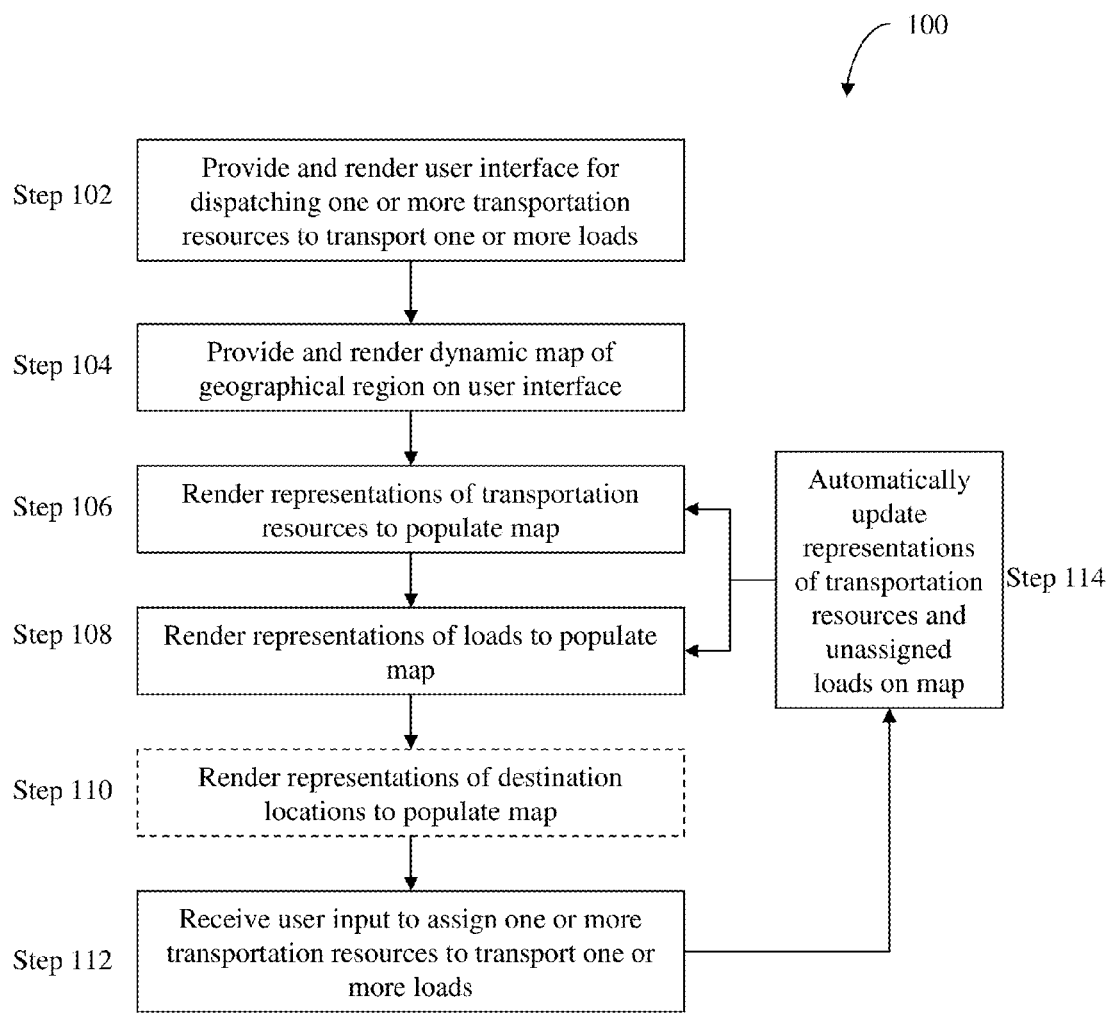
FIG. 1 is a flowchart illustrating an exemplary method for providing a user interface for executing inbound transportation operations.

Exemplary embodiments address deficiencies of conventional transportation management systems that require multiple displays or interfaces for the display and management of transportation resources and operations. Exemplary embodiments may provide transportation management systems, devices and methods that allow display and management of transportation resources and operations in an integrated manner. Exemplary embodiments may provide, for example, a single dynamic and interactive interface for defining and executing inbound transportation operations (i.e., procurement or pickup operations), outbound transportation operations (i.e., delivery or shipment operations), and operations in which multiple transportation resources can be matched to one another (i.e., transportation resource matching operations). An exemplary dynamic and interactive interface provided in accordance with exemplary embodiments provides an efficient, convenient and streamlined manner of defining and executing transportation operations, and avoids the need for providing multiple interfaces and/or informational materials (e.g., separate maps or listings of loads or transportation resources) for defining and executing transportation operations.

In some exemplary embodiments, a separate user interface may be provided for each type of transportation operation, for example, a first user interface for performing inbound operations, a second user interface for performing outbound operations, a third user interface for performing transportation resource matching operations, and the like. In other exemplary embodiments, a single user interface may be used to perform two or more transportation operations.

Certain terms are defined below to facilitate understanding of exemplary embodiments.

As used herein, a "transportation resource" is a set of one or more resources that may be used to perform a transportation operation including, but not limited to, a vehicle (e.g., truck, van, bicycle, and the like), a non-motorized transport structure (e.g., trailer, and the like), an operator of a vehicle, a person who may manually transport a load, or any combination of the above.

As used herein, a "load" is a set of one or more physical objects that may be transported.

As used herein, a "transportation operation" is any operation involving one or more transportation resources including, but not limited to, dispatching one or more transportation resources to pick up or procure one or more loads, dispatching one or more transportation resources to deliver or ship one or more loads, combining two or more transportation resources together (e.g., combining a truck with a trailer), and the like.

As used herein, a "representation" of an entity on a user interface is any suitable audio-visual designation for the entity that may be viewed by a user on the interface and that may, in some embodiments, be selected and/or manipulated by the user. Exemplary representations of entities may include, but are not limited to, icons, pictures or pictograms, text, audio, a combination of the foregoing, and the like. Exemplary entities that may be represented on exemplary user interfaces include, but are not limited to, loads, transportation resources, geographical locations, and the like.

As used herein, a "pointing device" is any suitable input interface, specifically, a human interface device, that allows a user to input spatial data to a computing system or device. In an exemplary embodiment, the pointing device may allow a user to provide input to the computer using physical gestures, for example, pointing, clicking, dragging, dropping, etc. Exemplary pointing devices may include, but are not limited to, a mouse, a touchpad, and the like.

As used herein, a "drag-and-drop" operation is the action of selecting a first component rendered on a user interface by "grabbing" it (e.g., using a persistent mouse click) and dragging the first component to a different location on the user interface or onto a second component rendered on the user interface. Exemplary drag-and-drop operations may be performed by the user using a pointing device, e.g., a mouse, a touchpad, and the like.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

I. Exemplary Inbound and Outbound Transportation Operations

Exemplary systems, devices and methods may be used to define and execute one or more inbound transportation operations (procurement or pickup) in which one or more transportation resources are dispatched to pick up one or more unassigned loads from their current geographical locations and deliver them to one or more geographical destination locations. Exemplary systems, devices and methods may also be used to define and execute one or more outbound transportation operations (delivery or shipment) in which one or more transportation resources are dispatched to deliver one or more unassigned loads from their current geographical locations to one or more geographical destination locations.

An exemplary integrated transportation management system may provide and render a single user interface that displays representations of one or more transportation resources, representations of one or more loads, and/or representations of one or more geographical locations. The single user interface allows a user to perform a transportation operation by dispatching one or more transportation resources to transport one or more loads to their geographical destination locations. In an exemplary embodiment, the user may use a drag-and-drop operation to perform the transportation operation, for example, by dragging and dropping a representation of a transportation resource onto a representation of a load, or by dragging and dropping a representation of a load onto a representation of a transportation resource.

FIG. 1 is a flowchart that illustrates an exemplary method 100 for providing and rendering an exemplary graphical user interface configured to allow a user to execute one or more inbound and/or outbound transportation operations.

In step 102, an exemplary integrated transportation management system may provide and render a graphical user interface on a display device. The user interface may be configured to allow a user to interact with a single dynamic geographical map to define and execute one or more transportation operations.

In step 104, a dynamic and interactive map of a geographical region of interest may be provided and rendered on the user interface. The map may be interactive in that a user may select, manipulate and perform operations on components rendered on the map using, for example, a pointing device. A user may also perform other functions on the map including, but not limited to, zooming in, zooming out, panning to a different region on the map, and the like. The map may be dynamic in that it may include movable and/or moving components (e.g., representations of trucks) whose geographical locations may be tracked and updated on the map at time intervals or in real time. The geographical region of interest may be of any suitable granularity, for example, the world, a country, a state, a city, a part of a city, a collection of buildings, a single building, a single room, and the like. The map may include any suitable information on the geographical region of interest, for example, traffic conditions, weather conditions, and the like.

In step 106, representations of zero, one or more transportation resources may be rendered on the user interface to populate the map. In an exemplary embodiment, all transportation resources located within the scope of the map are represented on the user interface. In another exemplary embodiment, only available transportation resources (i.e., transportation resources that have available capacity to transport a load) located within the scope of the map are represented on the user interface. The current geographical locations of the transportation resources may be tracked, for example, by a global positioning system (GPS) device and/or a geographical information system (GIS), and dynamically updated on the map at time intervals (e.g., once every minute) or in real time as they move throughout the geographical region of interest. In an exemplary embodiment, the map may be refreshed at time intervals, in real time and/or by a user prompt in order to update the representations of available transportation resources and representations of their current geographical locations on the map.

The user interface may include any suitable information on the transportation resources including, but not limited to, type, size, capacity, availability status, towing capability, operator, and the like. The information may be presented on the user interface using any suitable technique, for example, in a text box, as different icon types (e.g., truck icons to represent trucks, trailer icons to represent trailers, special icons to represent refrigerated and non-refrigerated trucks, etc.), as different colored icons (e.g., red for unavailable transportation resources, green for available transportation resources), and the like. The user interface may allow selection of representations of one or more transportation resources directly on the map or in a separate component of the interface, e.g., in a text box or selection panel.

In step 108, representations of zero, one or more loads may be rendered on the user interface to populate the map. In an exemplary embodiment, all loads located within the scope of the map are represented on the user interface. In another exemplary embodiment, only unassigned loads (i.e., loads that have not yet been assigned for transportation) located within the scope of the map are represented on the user interface. The geographical locations of the loads may be tracked, for example, by a global positioning system (GPS) device and/or a geographical information system (GIS), and dynamically updated on the map at time intervals (e.g., once every minute) or in real time as they move throughout the geographical region of interest. In an exemplary embodiment, the map may be refreshed at time intervals, in real time and/or by a user prompt to update the representations of unassigned loads and representations of their geographical locations on the map.

The user interface may include any suitable information on the loads including, but not limited to, type, size, priority level, assignment status, vendor identification, one or more geographical destination locations of the load, and the like. The information may be presented on the user interface using any suitable technique, for example, in a text box or pop-up text component (e.g., to indicate a geographical destination location for the load), as different icon types (e.g., load icons to represent loads, special icons to represent perishable loads, etc), as different colored icons (e.g., red for unassigned loads, green for assigned loads), and the like. The user interface may allow selection of representations of one or more loads directly on the map or in a separate component of the interface, e.g., in a text box or selection panel.

Optionally, in step 110, representations of zero, one or more geographical destination locations associated with the loads may be rendered on the user interface to populate the map. In another exemplary embodiment, representations of the geographical destination locations may be provided separately from the map, e.g., in a pop-up component on the interface. In an exemplary embodiment, a pre-defined geographical location may be used as the geographical destination location for all assigned loads in a certain geographical region. In this case, a representation of the pre-defined geographical location may or may not be rendered on the map. In another exemplary embodiment, the user may be allowed to define one or more geographical destination locations associated with one or more loads using the interface. Once the geographical destination locations are represented on the interface, the interface may allow selection of the representations of one or more geographical destination locations directly on the map or in a separate component of the interface, e.g., in a text box or selection panel.

In step 112, the user interface may receive user input to assign one or more transportation resources to transport one or more loads using the dynamic and interactive map.

In step 114, based on the user's definition of a transportation operation, the system may automatically update the representations of the transportation resources and loads on the user interface. In exemplary embodiments, information on the transportation resources and loads may be automatically updated in any relevant databases. For example, the user interface and/or the databases may be updated to indicate that an assigned transportation resource is no longer available and that an assigned load is no longer unassigned. The user interface may also track and update the representations of the current geographical locations of the assigned transportation resource and load on the map at time intervals or in real time.

Figure 2:
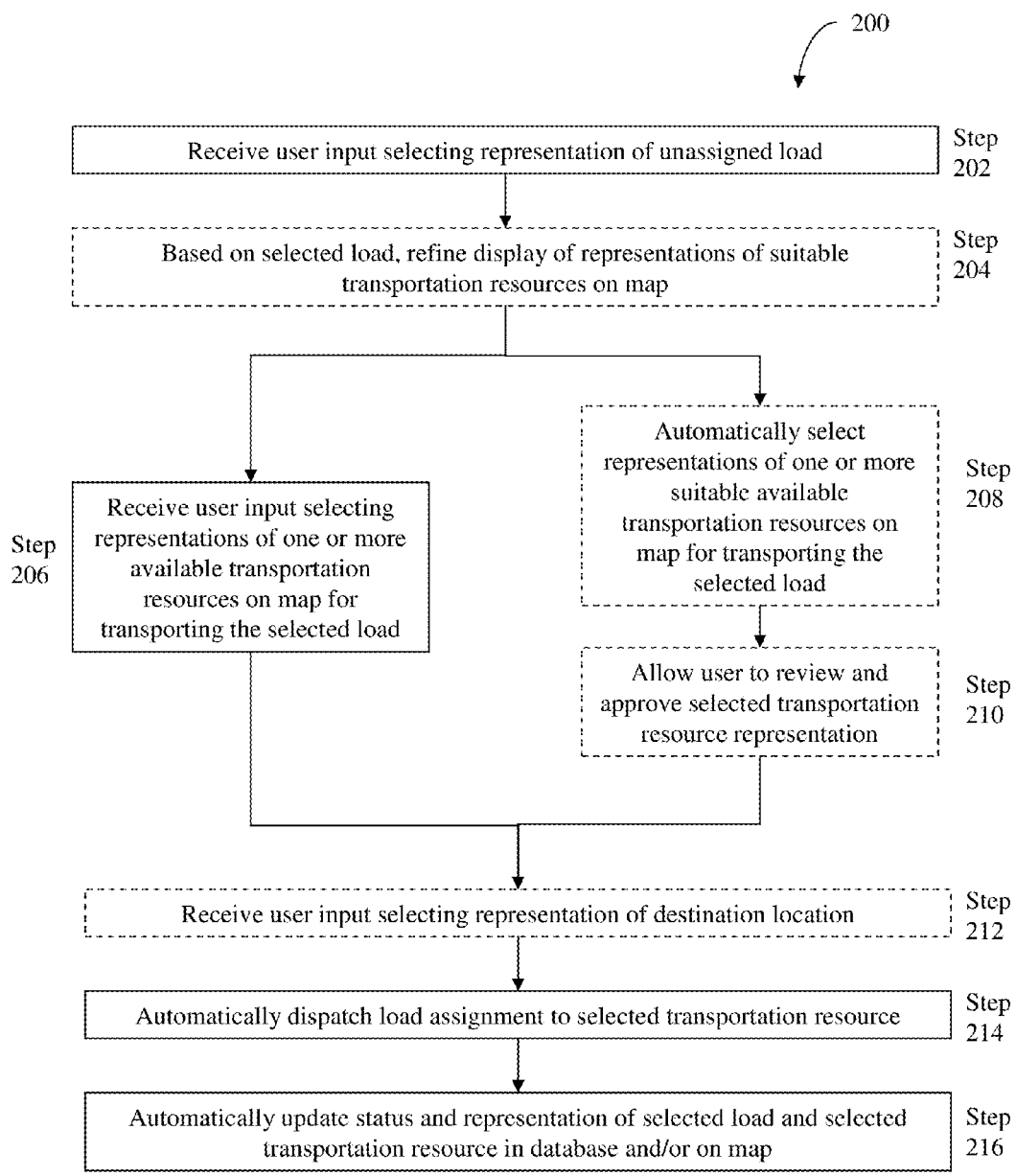
FIG. 2 is a flowchart illustrating an exemplary method of using a user interface provided in accordance with exemplary embodiments for executing inbound and/or outbound transportation operations.

FIG. 2 is a flowchart that illustrates an exemplary method 200 of using the exemplary user interface provided in method 100 of FIG. 1 to execute an inbound and/or outbound transportation operation in which a load is transported from its current geographical location (e.g., a vendor location or a storage location) to a geographical destination location (e.g., a store location or a storage location).

In step 202, the user interface may receive user input selecting representations of one or more unassigned loads on the map, i.e., loads that have not yet been assigned to a transportation resource for transportation. The user may select representations of the loads using any suitable technique including, but not limited to, clicking on a representation of the load on the map, selecting an identifier for the load in a panel associated with the map, using a voice command to identify the load, and the like.

In step 204, the integrated transportation management system may optionally analyze one or more characteristics of the load selected in step 202 to refine representations of one or more transportation resources on the map to indicate resources that may be particularly suitable for transporting the selected load. The refinement of the display of transportation resource representations may include displaying representations of only a suitable sub-set of the resources initially displayed, or highlighting the suitable sub-set within representations of all of the resources initially displayed. Exemplary embodiments may store predefined mappings between characteristics of loads and corresponding suitable characteristics of transportation resources in a database. Exemplary embodiments may retrieve and analyze these mappings in determining a suitable sub-set of transportation resources in step 204.

In one example, the geographical location of the selected load may be used to display or highlight a sub-set of transportation resources that are within a certain distance of the selected load. In another example, the type of the selected load (e.g., non-perishable or perishable, non-hazardous or hazardous, etc.) may be used to display or highlight a sub-set of transportation resources that are suitable for transporting the type of load (e.g., refrigerated trucks may be more suitable for perishable loads). In another example, the weight and/or volume of the selected load may be used to display or highlight a sub-set of transportation resources that are capable of transporting the load (e.g., a van may be more suitable for transporting a small load, while a truck may be more suitable for transporting a large load). In other examples, a combination of two or more load characteristics may be used to refine the representations of suitable transportation resources.

In step 206, the user interface may receive user input selecting representations of one or more available transportation resources on the map for transporting the load selected in step 202. The user may select the representation of the transportation resource using any suitable technique including, but not limited to, using a pointing device to drag and drop a representation of the selected load onto a representation of the selected transportation resource, using a pointing device to first click on a representation of the selected load and subsequently click on a representation of the selected transportation resource, selecting an identifier for the transportation resource in a panel associated with the map, using a voice command to identify the transportation resource, and the like.

Optionally, the integrated transportation management system may allow automatic selection of representations of one or more available transportation resources for transporting the load selected in step 202. In step 208, the integrated transportation management system may analyze one or more characteristics of the load selected in step 202 and automatically select representations of one or more suitable available transportation resources on the map for transporting the selected load. Exemplary characteristics of the load that may be analyzed in step 208 are similar to and described in connection with the characteristics that may be used in step 204. If no suitable available transportation resource is available for transporting the selected load, the integrated transportation management system may indicate this to the user. In step 210, the integrated transportation management system may allow the user to review the automatic selection of the transportation resource and either approve or reject the selection. If the user rejects the automatic suggestion or selection, the integrated transportation management system may automatically select a representation of another suitable available transportation resource or may prompt the user for a selection.

In an exemplary embodiment, a pre-defined geographical location may be used as the geographical destination location for the load, e.g., a store location or a storage location.

In another exemplary embodiment, in step 210, the system may optionally allow the user to select a representation of a geographical destination location for the load. The representation of the geographical destination location may be selected using any suitable technique. In an example, the user may type the destination address (e.g., the street address) into the user interface. In another example, the user may use a pointing device to drag and drop a representation of the combined transportation resource and load (e.g., representing a truck and its assigned load) onto a representation of the geographical destination location on the map. In another example, the user may use a voice command to enter the destination address.

Subsequently, in step 212, the integrated transportation management system may automatically dispatch an assignment to the selected transportation resource to transport the selected load from its current geographical location to the geographical destination location. The assignment may include any suitable information on the assignment including, but not limited to, an identifier for the load, the current geographical location of the load, the destination address for the load, the time-frame for completing the operation, and the like. An exemplary assignment may be dispatched to a suitable entity using any suitable technique including, but not limited to, electronic data interchange (EDI) messaging, email, fax, voice message, paging, and the like. The entity may be any suitable person(s) including, but not limited to, the driver of the transportation resource, the supervisor of the driver of the transportation resource, a transportation manager, and the like. The operator may have the option of accepting or rejecting the assignment, which may then be communicated to the integrated transportation management system.

If the operator accepts the assignment, in step 214, the integrated transportation management system may automatically update the status of the selected load and the selected resource on the map and/or in any relevant databases to indicate that the selected load has been assigned to a resource and that the selected transportation resource is no longer available. The transportation resource may again be indicated as being available once the transportation operation is completed.

Figure 3:
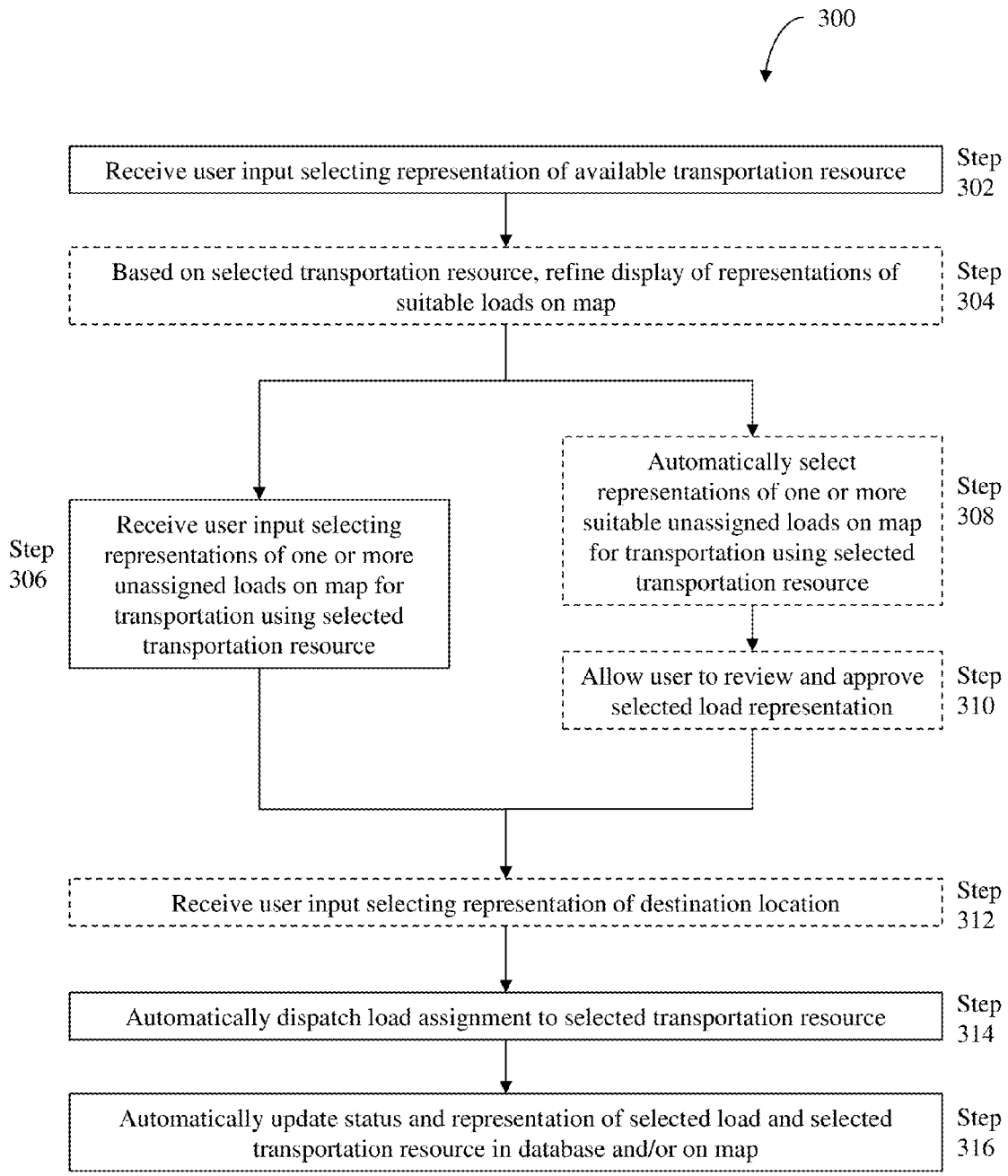
FIG. 3 is a flowchart illustrating another exemplary method of using a user interface provided in accordance with exemplary embodiments for executing inbound and/or outbound transportation operations.

FIG. 3 is a flowchart that illustrates another exemplary method 300 of using the exemplary user interface provided in method 100 of FIG. 1 to execute an inbound and/or an outbound operation in which a load is transported from its current geographical location (e.g., a vendor location or a storage location) to a geographical destination location (e.g., a store location or a storage location).

In step 302, the user interface may receive user input selecting representations of one or more available transportation resources on the map, i.e., transportation resources that have available capacity to transport a load. The user may select the representations of the transportation resources using any suitable technique including, but not limited to, clicking on a representation of the transportation resource on the map, selecting an identifier for the transportation resource in a panel associated with the map, using a voice command to identify the transportation resource, and the like.

In step 304, the integrated transportation management system may optionally analyze one or more characteristics of the transportation resource selected in step 302 to refine the representations of the loads on the map to indicate the loads that may be particularly suitable for transportation using the selected transportation resource. The refinement of the load representations may include displaying representations of only a suitable sub-set of the loads initially displayed, or highlighting the suitable sub-set within representations of all of the loads initially displayed. Exemplary embodiments may store predefined mappings between characteristics of transportation resources and corresponding suitable characteristics of loads in a database. Exemplary embodiments may retrieve and analyze these mappings in determining a suitable sub-set of loads in step 304.

In one example, the geographical location of the selected transportation resource may be used to display or highlight representations of a sub-set of loads that are within a certain distance of the selected transportation resource. In another example, the type of the selected transportation resource (e.g., refrigerated or non-refrigerated) may be used to display or highlight representations of a sub-set of loads that are suitable for transportation using the type of transportation resource (e.g., perishable loads may be more suitable for transportation by refrigerated trucks). In another example, the size of the transportation resource may be used to display or highlight representations of a sub-set of loads that the selected transportation resource is suitable for transporting (e.g., a small load may be more suitable for transportation using a van, while a large load may be more suitable for transportation using a truck). In other examples, a combination of two or more transportation resource characteristics may be used to refine the representations of suitable loads.

In step 306, the user interface may receive user input selecting representations of one or more unassigned loads on the map for transportation using the transportation resource selected in step 302. The user may select representations of the loads using any suitable technique including, but not limited to, using a pointing device to drag and drop a representation of the selected transportation resource onto a representation of the selected load, using a pointing device to click on a representation of the selected transportation resource and subsequently clicking on a representation of the selected load, selecting an identifier for the load in a panel associated with the map, using a voice command identifying the load, and the like.

Optionally, the integrated transportation management system may allow automatic selection of representations of one or more unassigned loads for transportation using the transportation resource selected in step 302. In step 308, the integrated transportation management system may analyze one or more characteristics of the transportation resource selected in step 302 and automatically select representations of one or more suitable unassigned loads on the map for transportation using the selected transportation resource. Exemplary characteristics of the transportation resource that may be analyzed in step 308 are similar to and are described in connection with the characteristics that may be used in step 304. If no suitable unassigned load is available for transportation using the selected transportation resource, the integrated transportation management system may indicate this to the user. In step 310, the integrated transportation management system may allow the user to review the automatic selection of the load and either approve or reject the automatic selection. If the user rejects the automatic selection, the integrated transportation management system may automatically select the representation of another suitable unassigned load or may prompt the user for a selection.

Steps 312, 314 and 316 of method 300 are similar to and described in connection with steps 212, 214 and 216 of method 200.

Figure 4:
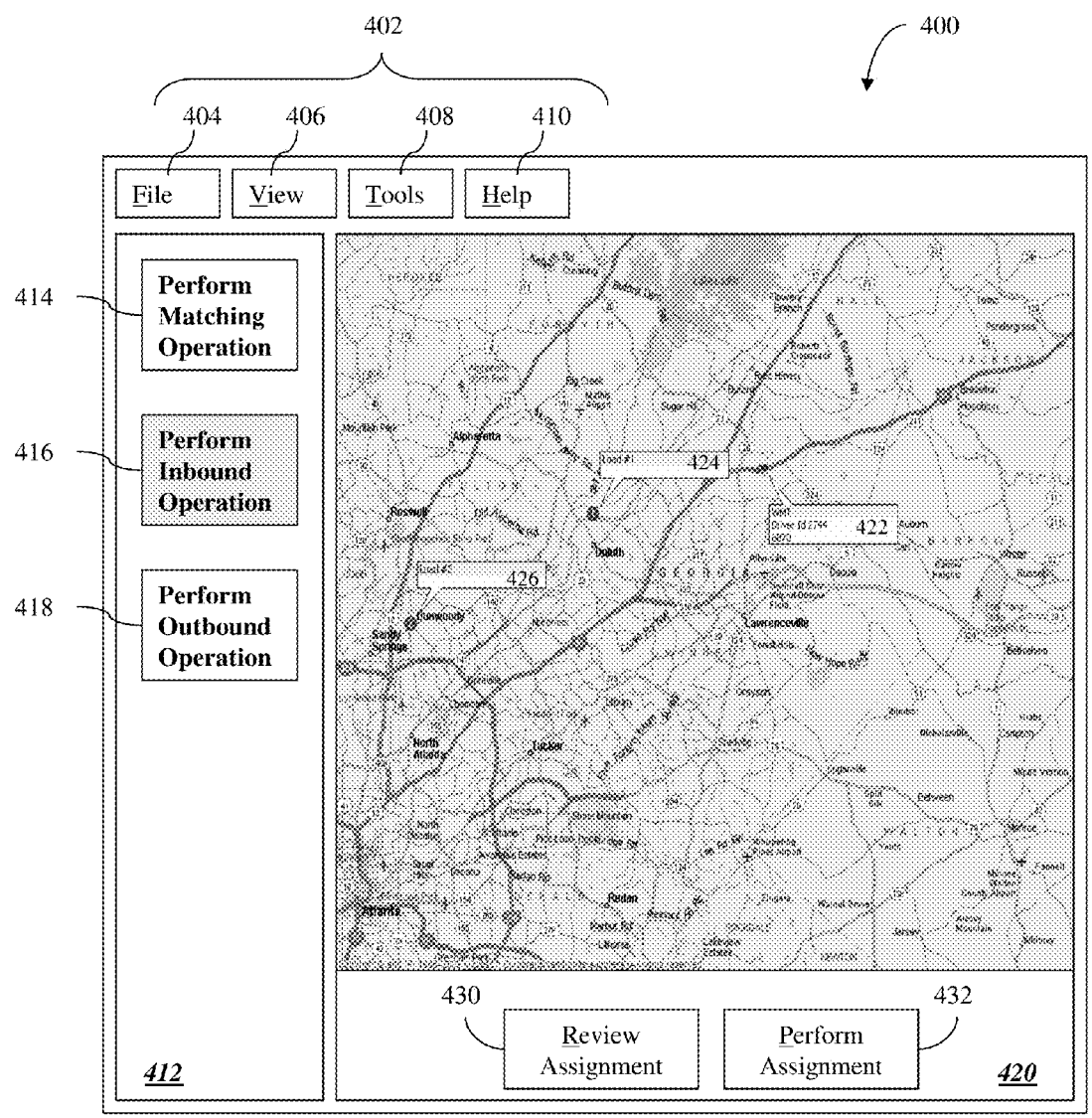
FIG. 4 is an exemplary user interface for executing inbound and/or outbound transportation operations.

FIG. 4 illustrates an exemplary graphical user interface 400 that may be provided using method 100 of FIG. 1 and that may be used to perform method 200 of FIG. 2 and method 300 of FIG. 3. In an exemplary embodiment, interface 400 may include a menu 402 of general options including, but not limited to, a "File" menu item 404 that may allow the user to start a new session, save the current session, print the current session, exit the interface, and the like; a "View" menu item 406 that may allow the user to configure the view of the interface (e.g., select a textual view and/or graphical view); a "Tools" menu item 408 that may allow the user to configure other options relevant to the interface (e.g., select the databases that may be accessed to populate the user interface); and a "Help" menu item 410 that may provide information on using the interface.

In an exemplary embodiment, interface 400 may include an operation selection panel 412 that allows the user to select a type of transportation operation including, but not limited to, a selectable "perform matching operation" option 414 that allows the user to match two or more transportation resources to one another, a selectable "perform inbound operation" option 416 that allows the user to dispatch one or more transportation resources to pick up one or more loads, and a selectable "perform outbound operation" option 418 that allows the user to dispatch one or more transportation resources to drop off one or more loads. In an exemplary embodiment, the "perform inbound operation" option 416 and the "perform outbound operation" option 418 may be combined into a single option that may be represented as a single selectable component on the user interface.

In an exemplary embodiment, interface 400 may include an operation details panel 420 that is associated with an operation selected in the operation selection panel 412. The operation details panel 420 may be rendered and populated based on the option selected by the user in the operation selection panel 420. FIG. 4 illustrates an exemplary operation details panel 420 associated with a "perform inbound operation" or a "perform outbound operation" selection in panel 412.

An exemplary operation details panel 420, associated with a "perform inbound operation" or a "perform outbound operation," may display a dynamic and interactive map of a particular geographical region (e.g., Ga., Atlanta in FIG. 4). The map may include dynamically updated representations of one or more available transportation resources and one or more unassigned loads, for example, truck 422 and loads 424 and 426. The transportation resources and loads may be represented on the map using any suitable audio-visual component including, but not limited to, icons, small pictures, and the like. The current geographical locations of the transportation resources and loads may be tracked, for example, by a global positioning system (GPS) device and/or a geographical information system (GIS), and dynamically updated on the map at time intervals (e.g., once every minute) or in real time as they move throughout the region. The map may include any suitable information on the geographical region (e.g., traffic conditions, weather conditions), the transportation resources (e.g., type, size, availability status, operator, and the like), the loads (e.g., type, size, priority level, assignment status, vendor identification, and the like). The information may be presented in panel 420 using any suitable technique, for example, in a text box, as different icon types (e.g., truck icons to represent trucks, trailer icons to represent trailers, load icons to represent loads, special icons to represent refrigerated and non-refrigerated trucks, special icons for dry and perishable loads), as different colored icons (e.g., red for unavailable trucks, green for available trucks), and the like.

Exemplary embodiments may allow the user to search for representations of one or more particular transportation resources and/or loads on the map using one or more characteristics of the resources and/or loads as the search criteria. Exemplary may allow the user to search for representations of one or more geographical locations on the map using one or more characteristics of the locations as the search criteria. In an exemplary embodiment, a geographical destination location for a load may be pre-defined and may be associated with the load (e.g., as an attribute of the load). In another exemplary embodiment, the geographical destination location may be defined on the user interface by the user. In this exemplary embodiment, the user may perform the assignment using any suitable technique including, but not limited to, using a pointing device to drag and drop the representation of truck 422 onto the representation of load 424 to create a combined representation and then dragging and dropping the combined representation onto a representation of the geographical destination location 428 on the interface, using a pointing device to drag and drop the representation of load 424 onto the representation of truck 422 to create a combined representation and then dragging and dropping the combined representation onto a representation of the geographical destination location 428 on the interface, using voice commands to assign truck 422 to deliver load 424 to the geographical destination location 428, selecting a representation of the geographical destination location in a separate selection panel, and the like.

Exemplary embodiments may allow batch operations. In an example of a batch operation, the user may assign representations of a set of two or more transportation resources to a representation of a particular load. The user may perform the assignment using any suitable technique including, but not limited to, using a pointing device to drag and drop representations of the transportation resources onto a representation of the load, using a pointing device to drag and drop a representation of the load onto representations of the transportation resources, highlighting or otherwise selecting representations of the transportation resources and the load, using voice commands to select representations of the transportation resources and load, and the like.

In another example of a batch operation, the user may assign a set of two or more loads for delivery using a transportation resource to a geographical destination location. The user may perform the assignment using any suitable technique including, but not limited to, using a pointing device to drag and drop representations of the loads onto a representation of the transportation resource, highlighting or otherwise selecting representations of the transportation resource and loads, using voice commands to select the transportation resource and loads, and the like.

Exemplary embodiments may allow serial operations. In an example of a serial operation, the user may select a representation of truck 422 and assign it to a representation of load 424 and also assign it to a representation of load 426 serially in order to return both loads to a geographical destination location. The user may perform the serial assignments using any suitable technique including, but not limited to, using a pointing device to drag and drop the representation of truck 422 first onto the representation of load 424 and then onto the representation of load 426, using a pointing device to drag and drop the representations of loads 424 and 426 onto the representation of truck 422, highlighting or otherwise selecting representations of truck 422 and loads 424 and 426, using voice commands to select truck 422 and loads 424 and 426, using a pointing device to drag and drop the representation of truck 722 first onto the representation of load 724 and then onto the representation of load 726 followed by selection of a representation of a destination address, and the like.

The operation details panel 420 may include one or more options for reviewing and executing a transportation operation including, but not limited to, a "review assignment" option 430 that allows the user to review the selections of representations of transportation resources, loads and destination addresses, and a "perform assignment" option 432 that allows the user to automatically execute the transportation operation, for example, by dispatching the assignment to a transportation manager or an operator of the transportation resources.

Exemplary embodiments may allow batch operations. In an example of a batch operation, the user may assign a set of two or more transportation resources to transport a particular load. This type of batch operation may facilitate transportation of a large load using multiple transportation resources in order to complete the transportation operation in an efficient manner. The user may perform the above type of batch assignment using any suitable technique including, but not limited to, using a pointing device to drag and drop representations of the resources onto a representation of the load, using a pointing device to drag and drop a representation of the load onto representations of the resources, combining representations of the selected transportation resources into a set representation and dragging and dropping the set representation onto a representation of the load, highlighting or otherwise selecting representations of the transportation resources and the load, using voice commands to identify the transportation resources and load, and the like.

In another example of a batch operation, the user may assign a set of two or more loads for delivery in an inbound or an outbound operation using a transportation resource. This type of batch operation may allow a transportation resource with large capacity (e.g., carrying capacity, towing capacity) to simultaneously transport multiple loads in order to complete the transportation operations for the loads in an efficient manner. For example, in a doubles run, a tractor may be configured to pull multiple trailers, with each trailer carrying a load. The tractor may be assigned to pick up multiple loads using the trailers at a geographical pickup location and to drop off the loads at a common geographical destination location or at different geographical destination locations. In an example of a serial operation that follows this batch operation, the same tractor may be assigned to pick up additional loads using the trailers at the geographical destination location and to drop off the loads at the geographical pickup location or at different geographical locations in the return leg of its travel.

The user may perform the above type of batch assignment using any suitable technique including, but not limited to, using a pointing device to drag and drop representations of the loads onto a representation of the transportation resource, highlighting or otherwise selecting representations of the transportation resource and loads, using a pointing device to drag and drop a representation of the transportation resource onto representations of the loads, combining representations of the selected loads into a set representation and dragging and dropping the set representation onto a representation of the transportation resource, using voice commands to select the transportation resource and loads, and the like.

Exemplary embodiments may allow serial operations in which a transportation resource is assigned to perform two or more transportation operations one after another. In an example of a serial operation, a user may assign a transportation resource to pick up two or more loads and deliver them to a geographical destination location. For example, a truck may be assigned to shuttle loads located at different locations within the I285 beltway in Ga., Atlanta to a drop yard located outside the beltway. The transportation resource may be assigned to complete the pickup and delivery of one load before moving to the next load, or may be assigned to pick up multiple loads and deliver them at the same time. In the above example, after the loads are delivered to the drop yard, one or more other transportation resources may be assigned to deliver the loads at the drop yard to one or more geographical destination locations.

The user may perform a serial operation using any suitable technique including, but not limited to, using a pointing device to drag and drop a representation of the transportation resource first onto a representation of a first load and then onto representations of one or more additional loads, using a pointing device to drag and drop representations of multiple loads onto a representation of the transportation resource, highlighting or otherwise selecting representations of the transportation resource and the multiple loads, using voice commands to select the transportation resource and the multiple loads, and the like.

In an exemplary embodiment of a serial operation, upon selection of a first transportation operation, the integrated transportation management system may automatically recommend a second transportation operation to be performed serially to optimize the use of transportation resources. The system may analyze one or more suitable factors in making a recommendation including, but not limited to, the distance between two geographical pickup locations. For example, if a truck is assigned to pick up a first load at a first geographical pickup location, the system may determine that the truck has a greater available capacity than the first load and may recommend that the same truck pick up a second load at the same first geographical pickup location or at a second geographical location that is geographically close to the first geographical pickup location. One of ordinary skill in the art will recognize that exemplary interface 400 is provided for illustrative purposes and that other suitable interfaces may include textual interfaces or other graphical interfaces including more or fewer components than those illustrated in FIG. 4.

II. Exemplary Transportation Resource Matching Operations

Exemplary systems, devices and methods may be used to select a single transportation resource (e.g., a truck, a van, a driver, etc.) to perform a transportation operation. Exemplary systems, devices and methods may also be used to match a first transportation resource (e.g., a truck) to one or more additional resources (e.g., a suitable trailer). An exemplary integrated transportation management system allows a user to use a single user interface to combine two or more transportation resources and/or to configure a transportation resource with one or more additional resources.

Figure 5:
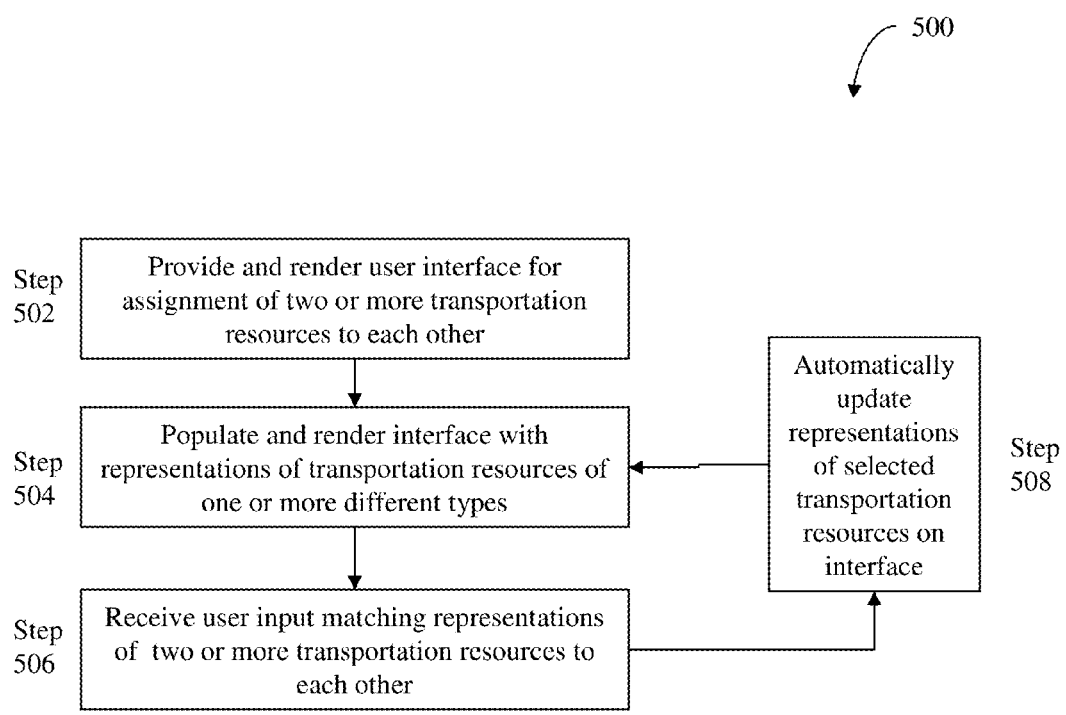
FIG. 5 is a flowchart illustrating an exemplary method for providing a user interface for matching two or more transportation resources to one another.

FIG. 5 is a flowchart that illustrates an exemplary method 500 for providing an exemplary user interface for executing a transportation resource matching operation.

In step 502, an exemplary integrated transportation management system may provide and render a user interface that allows a user to define and execute one or more transportation resource matching operations using the single interface.

Representations of one or more transportation resources may be rendered on the user interface. In step 504, the interface may be populated with representations of zero, one or more transportation resources. The system may obtain information on the transportation resources from one or more relevant transportation resource databases. In an exemplary embodiment, the system may display the entire set of transportation resources contained in a relevant database. In another exemplary embodiment, the system may display a sub-set of the transportation resources based on one or more criteria, e.g., only those transportation resources that are located in a certain geographical area, only those transportation resources that are currently available, and the like. The system may also display any suitable information on the transportation resources including, but not limited to, the geographical location of the resources, the size and type of the resources, the operators of the resources, and the like. The information may be presented on the interface using any suitable technique, for example, in a text box, as different icon types (e.g., truck icons to represent trucks, trailer icons to represent trailers, special icons to represent refrigerated and non-refrigerated trucks, etc.), as different colored icons (e.g., red for unavailable transportation resources, green for available transportation resources), and the like. In exemplary embodiments, different categories of transportation resources may be displayed separately from one another, for example, in separate panels for trucks, trailers, vans, bicycles, and the like.

The integrated transportation management system may allow a user to select two or more transportation resources, concurrently or consecutively, for matching the resources to one another. In step 506, the interface may receive user input selecting and combining two or more transportation resources.

In step 508, based on the user's definition of a transportation resource matching operation, the system may automatically update the representations of and/or information on transportation resources on the user interface and/or in a database.

Figure 6:
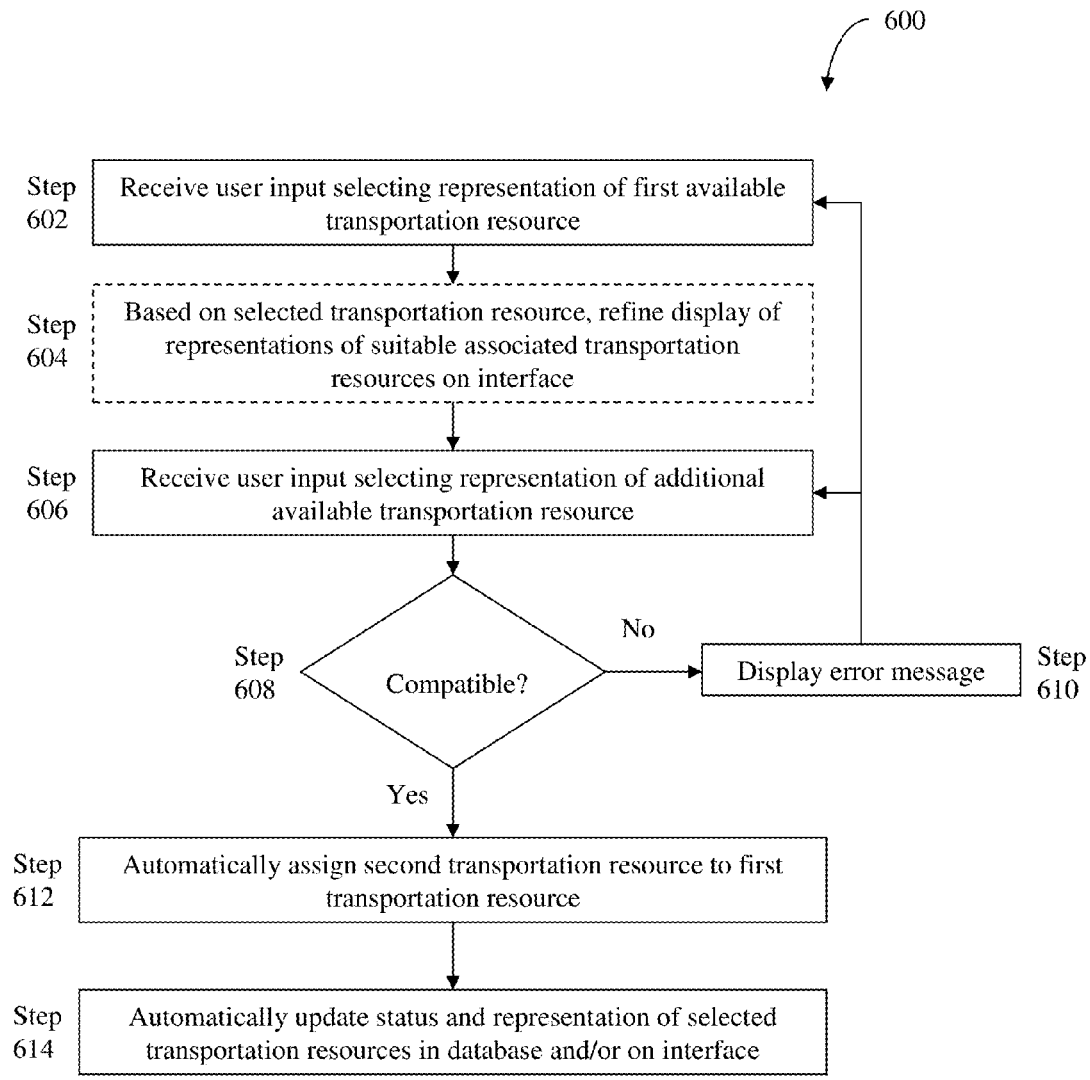
FIG. 6 is a flowchart illustrating an exemplary method of using a user interface provided in accordance with exemplary embodiments for matching two or more transportation resources to one another.

FIG. 6 is a flowchart that illustrates an exemplary method 600 of using an exemplary user interface that may be provided in method 500 of Figure in order to match two or more transportation resources to one another.

In step 602, the user interface may receive user input selecting a representation of a first transportation resource, e.g., a truck. The user may select the transportation resource using any suitable technique including, but not limited to, clicking on a representation of the resource on the interface, using a voice command to identify the transportation resource, and the like.

In step 604, the integrated transportation management system may optionally analyze one or more characteristics of the transportation resource selected in step 602 to refine the representations of the other transportation resources on the interface to indicate the resources that may be particularly suitable for matching with the selected first transportation resource. For example, certain trailers may be more suitable for hitching to a selected truck. The refinement of the representations of the transportation resources may include displaying representations of only a suitable sub-set of the resources initially displayed on the interface, or highlighting the suitable sub-set within representations of all of the resources initially displayed on the interface. Exemplary embodiments may store predefined mappings among different characteristics of different types of transportation resources. Exemplary embodiments may retrieve and analyze these mappings in determining a suitable sub-set of transportation resources in step 604.

In one example, the size and/or type of the first transportation resource may be used to display or highlight representations of a sub-set of additional transportation resources that are compatible with the size and/or type of the first resource (e.g., displaying representations of oversize trailers for a selected oversize truck). In another example, the geographical location of the first transportation resource may be used to display or highlight representations of a sub-set of additional transportation resources that are within a certain geographical distance of the first resource. In other examples, a combination of two or more characteristics of the first resource may be used to refine the representations of suitable additional resources.

In step 606, the user interface may receive user input to select one or more additional transportation resources on the interface for configuring the first transportation resource selected in step 602. The user may select the additional one or more transportation resources using any suitable technique including, but not limited to, using a pointing device to drag and drop a representation of the first transportation resource onto representations of the additional transportation resources, using a pointing device to drag and drop representations of the additional transportation resources onto a representation of the first transportation resource, using a pointing device to click on representations of the additional transportation resources, selecting identifiers for the additional transportation resources in a panel, using a voice command to identify the additional transportation resources, and the like.

In step 608, the integrated transportation management system may automatically determine whether the additional transportation resources selected in step 606 are compatible with the first transportation resource selected in step 602. In exemplary embodiments, the system may review one or more suitable characteristics of the selected resources to determine their compatibility. In one example, if a truck and a trailer are selected, the system may determine whether the selected truck has towing capability. In this example, selection of a trailer and a truck with towing capability may be determined to be compatible, whereas selection of a trailer and a truck without towing capability may be determined to be incompatible. In another example, the selection of multiple trucks may be determined to be incompatible. In another example, the selection of a single truck with dual towing capability (i.e., the ability to pull two trailers) and two trailers may be determined to be compatible. Conversely, the selection of a single truck with no towing capability or single towing capability (i.e., the ability to pull a single trailer) and multiple trailers may be determined to be incompatible. To this end, exemplary embodiments may provide a predefined listing of compatible combinations and incompatible combinations in a database for performing step 608.

If the selections made in steps 602 and 606 are determined to be incompatible, the system may provide an incompatibility error message to the user in step 610 and may prevent the current transportation resource matching operation. In this case, the user may be allowed to enter different selections in step 602 and/or step 606.

However, if the selections made in steps 602 and 606 are determined to be compatible, the system may, in step 612, automatically dispatch and execute the matching operation. An exemplary operation may be dispatched to any suitable entity including, but not limited to, a transportation manager, one or more operators of the selected resources, and the like. The operation may be dispatched by any suitable technique including, but not limited to, electronic data interchange (EDI) messaging, email, fax, voice message, paging, and the like. In response, the transportation management and/or the operators may configure the selected resources in the manner defined on the interface.

In step 614, the integrated transportation management system may automatically update the status of the selected resources in any relevant databases and/or the representations on the selected resources on the interface in order to indicate that the resources have been matched to one another.

Figure 7:
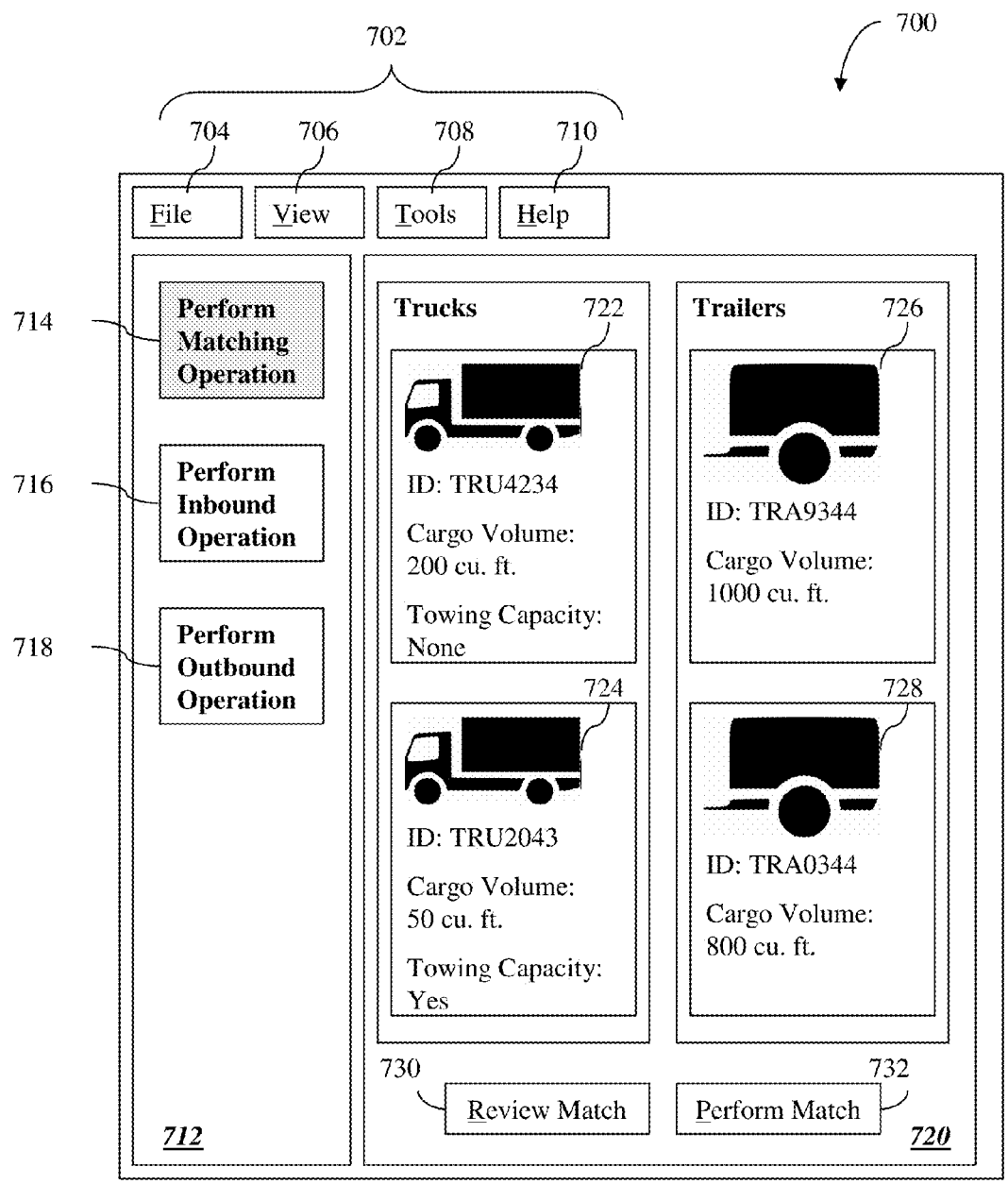
FIG. 7 is an exemplary user interface for executing transportation resource matching operations.

FIG. 7 illustrates an exemplary graphical interface 700 that may be provided using method 500 of FIG. 5 and that may be used to perform method 600 of FIG. 6. Items 702, 704, 706, 708, 710, 712, 714, 716, 718, and 720 of FIG. 7 are similar to and are described in connection with items 402, 404, 406, 408, 410, 412, 414, 416, 418, and 420 of FIG. 4.

In an exemplary embodiment, interface 700 may include an operation details panel 720 that is associated with a particular type of operation selected in an operation selection panel 712. FIG. 7 illustrates an exemplary operation details panel 720 associated with the "perform matching operation" selection in panel 712. In exemplary embodiments, operation details panel 720 may display representations of one or more transportation resources available to the user, for example, trucks 722 and 724 and trailers 726 and 728. The transportation resources may be represented on the map using any suitable audio-visual component including, but not limited to, icons, small pictures, and the like. In exemplary embodiments, operation details panel 720 may display information regarding the transportation resources displayed, for example, identifiers for the transportation resources, cargo volumes, towing capabilities, whether the resources are equipped with lift gates, current geographical locations of the resources (e.g., on a map), operators, and the like. The information may be presented in panel 720 using any suitable technique, for example, in text-form (e.g., in a popup box), as different icon types (e.g., truck icons to represent trucks, trailer icons to represent trailers, special icons to represent refrigerated and non-refrigerated trucks), as different colored icons (e.g., red for unavailable trucks, green for available trucks), and the like.

A user may select a representation of a single transportation resource, e.g., truck 722 or truck 724, to assign the corresponding transportation resource to perform a transportation operation. A user may also select representations of two or more of the displayed transportation resources for use in combination, for example, truck 724 and trailer 726. The user may review information regarding the transportation resources on the interface 700 in order to select one or more transportation resources. For example, if a transportation operation involves curbside delivery of a load, the user may select a transportation resource equipped with a lift gate, e.g., a truck equipped with a Tommy lift gate.

In an exemplary embodiment, the interface 700 may including one or more selection components for allowing a user to select one or more characteristics of a transportation operation. The interface 700 may receive the user's selections, analyze the selections, and automatically display and/or highlight transportation resources that are suitable for the user's selections. For example, the user may specify that a transportation operation involves curbside delivery of a load. In response to the user's specification, the interface 700 may display or highlight only those transportation resources that are equipped with a lift gate which is required to perform curbside delivery.

Exemplary embodiments may also allow the user to search for particular transportation resources on the interface using one or more characteristics of the resources as the search criteria.

If the user selects representations of two or more transportation resources that are incompatible, the operation details panel 720 may display an incompatibility error message to the user and prevent the matching operation. Examples of incompatibility include, but are not limited to, matching a truck with no towing capability (e.g., truck 722) to a trailer (e.g., trailers 726 or 728), matching two trucks to each other (e.g., trucks 722 and 724), matching two trailers to each other (e.g., trailers 726 and 728), and the like.

The operation details panel 720 may include one or more options for reviewing and executing a matching operation including, but not limited to, a "review match" option 730 that allows the user to review the selections of transportation resource representations (e.g., truck with ID "TRU2043" and trailer with ID "TRA9344") and a "perform match" option 732 that allows the user to automatically dispatch and execute the matching operation, for example, by assigning a transportation management or operators of the transportation resources to configure the resources in the defined manner.

A transportation resource matching operation, performed using the interface 700, may be used in conjunction with the interface 400 to select one or more transportation resources and to assign the resources to perform one or more inbound and/or outbound transportation operations.

One of ordinary skill in the art will recognize that exemplary interface 700 is provided for illustrative purposes and that other suitable interfaces may include textual interfaces or other graphical interfaces including more or fewer components than those illustrated in FIG. 7.

III. Exemplary Object-Oriented Implementation

In some exemplary embodiments, a transportation resource management system may be implemented in any suitable object-oriented programming language, e.g., Java. In an exemplary object-oriented implementation, classes may be defined for different types of entities provided and rendered on a user interface in accordance with exemplary embodiments. For example, a "Truck" class may be provided to define trucks, a "Trailer" class may be provided to define trailers, a general "TransportationResource" class may be provided to generally define transportation resources, and a "Load" class may be provided to define loads. One or more instances may be created from each class, for example, truck objects may be instantiated from the "Truck" class, load objects may be instantiated from the "Load" class, and the like. In an exemplary embodiment, a class may be defined for each type of transportation resource, e.g., a "Truck" class associated with trucks, a "Trailer" class associated with trailers, a "Bicycle" class associated with bicycles, and the like.

The object instantiations may be made persistent so that the states of the objects may be saved during a current session and reloaded from memory for future sessions. A class may include indications of zero, one or more attributes associated with properties or characteristics of the class objects. The attribute values may be specified for a particular class object when the class is instantiated. A class may also include zero, one or more methods associated with the behavior exhibited by class objects at program run time. The methods may have access to data stored in a class object and may be able to control or set the attributes of the class object. In an exemplary embodiment, a class interface may be defined to provide a collection of methods common to two or more types of transportation resources.

Figure 8:
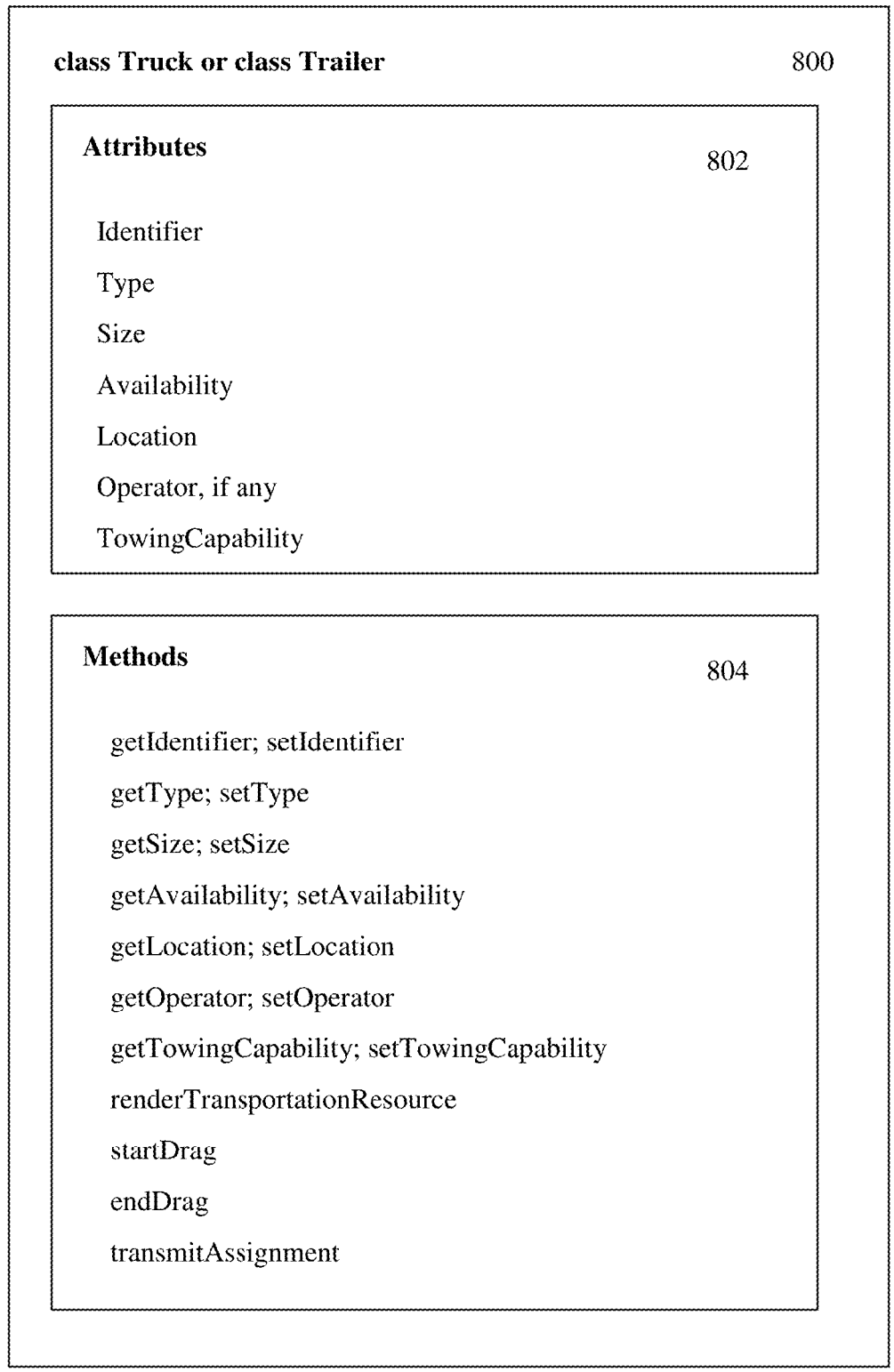
FIG. 8 is a block diagram of an exemplary class for representing a type of a transportation resource.

FIG. 8 illustrates a block diagram of an exemplary "Truck" or "Trailer" class 800 for defining a type of transportation resource, more specifically, a truck and/or a trailer. One of ordinary skill in the art will recognize that any suitable class structure and class components may be used to define a type of transportation resource, and that such class structures and components are not limited to the illustrative embodiment of FIG. 8.

The class 800 may include one or more attributes 802 associated with a truck or trailer object including, but not limited to, a unique identifier of the transportation resource (e.g., Truck No. 13422), one or more types corresponding the transportation resource (e.g., oversize, refrigerated, non-refrigerated), the size of the transportation resource (e.g., dimensions, volume capacity, weight capacity), the current availability of the transportation resource (e.g., whether a truck is currently available to transport a load), the current geographical location of the transportation resource (e.g., a periodically updated GPS location, a street location or a descriptive location of the transportation resource), an operator of the transportation resource if any (e.g., operator "Bob Smith" is the operator of Truck No. 13422), whether the transportation resource has towing capability, and the like.

The class 800 may include one or more methods 804 associated with a truck or a trailer object. Exemplary embodiments may provide a code generation module for generating code associated with the methods 804. The code may be executed at run time to perform the functionality encapsulated in the methods 804.

In exemplary embodiments, the class 800 may include one or more "get" methods for obtaining the values of one or more attributes of a class object and one or more "set" methods for setting the values of one or more attributes of a class object. In an exemplary embodiment, a "getIdentifier" method and a "setIdentifier" method may allow obtaining and setting, respectively, the value of the "Identifier" attribute which designates the unique identifier of a transportation resource object. A "getType" method and a "setType" method may allow obtaining and setting, respectively, the value of the "Type" attribute which designates one or more types associated with a transportation resource object. A "getSize" method and a "setSize" method may allow obtaining and setting, respectively, the value of the "Size" attribute which designates the size, volume capacity and/or weight capacity associated with a transportation resource object. A "getAvailability" method and a "setAvailability" method may allow obtaining and setting, respectively, the value of the "Availability" attribute which designates whether a transportation resource object is currently available. A "getLocation" method and a "setLocation" method may allow obtaining and setting, respectively, the value of the "Location" attribute which designates the current location of a transportation resource object. A "getOperator" method and a "setOperator" method may allow obtaining and setting, respectively, the value of the "Operator" attribute which designates one or more operators associated with a transportation resource object. A "getTowingCapability" method and a "setTowingCapability" method may allow obtaining and setting, respectively, the value of the "TowingCapability" attribute which designates whether the transportation resource object has towing ability.

The class 800 may include a "renderTransportationResource" method that visually renders a representation of a transportation resource object on a user interface. Exemplary representations may include, but are not limited to, an icon rendered on the user interface to represent a transportation resource object. In an exemplary embodiment, the "renderTransportationResource" method may be specific to the particular class in which it belongs so that a different icon type is rendered for a different class of transportation resource. For example, the "Truck" class may include a "renderTransportationResource" method that renders a truck representation, while the "Trailer" class may include a "renderTransportationResource" method that renders a trailer representation.

In exemplary embodiments, the "renderTransportationResource" method may use the "get" methods to obtain the values of one or more attributes, and may use the attribute values in customizing and/or updating the rendering of the representation of the class object. In an exemplary embodiment, the value of the "Identifier" attribute may be rendered on the user interface, for example, as a pop-up component associated with the representation, on the representation directly, and the like. In an exemplary embodiment, the value of the "Type" attribute may be used to customize the representation, for example, an oversize truck may be represented by a larger than usual representation, a refrigerated truck may be represented using a different representation than a non-refrigerated truck, and the like. In an exemplary embodiment, the value of the "Size" attribute may be used to customize the representation of the class object (for example, a high capacity truck may be represented by a larger than usual icon), or may be represented on the user interface, for example, in a pop-up component associated with the representation, on the representation directly, and the like. In an exemplary embodiment, the value of the "Availability" attribute may be used to customize the representation, for example, an available truck may be represented in a different color than an unavailable truck or using a different type of representation than an unavailable truck. In an exemplary embodiment, the value of the "Location" attribute may be used to render the transportation resource representation at a representation of its current geographical location on a geographical map. The value of the "Location" attribute may be periodically obtained using the getLocation method to update the representation of the location of a moving resource on the map. In an exemplary embodiment, the value of the "Operator" may be rendered on the user interface, for example, as a pop-up component on the representation, on the representation directly, and the like.

The class 800 may include a "startDrag" method and an "endDrag" method for tracking, respectively, the start and end of a drag-and-drop user operation in which a representation representing a class object is dragged and dropped from one location to another location on a user interface. The "startDrag" method may begin tracking the movement of the representation on the user interface and its overlap with any other user interface components. The "endDrag" method may end the tracking of the representation and may determine if the representation is dropped in an overlapping position with a second component on the user interface. The second component may be a load representation, a transportation resource representation, a geographical location representation, and the like. In one example, a truck representation may be dragged and dropped onto a load representation to assign the truck to the load. In another example, a truck representation may be dragged and dropped onto a location on the user interface (representing a geographical location) to dispatch the truck to the destination location. The "endDrag" method may determine a second class object and/or a second class associated with the second component. The "endDrag" method may output the identity of the second object associated with the second component to a "transmitAssignment" method to assign the transportation resource object to the second object.

The "transmitAssignment" method may transmit an assignment of the transportation resource object associated with the method to the second object identified by the "endDrag" method. In one example, the transportation resource object (e.g., a truck) may be assigned to a second transportation resource object (e.g., a trailer). In this case, the "transmitAssignment" may send a message or assignment to a transportation manager or an operator of the transportation resource object that the resource (e.g., the truck) is to be matched with the transportation resource corresponding to the second object (e.g., the trailer). The "endDrag" method may determine the identifier of the transportation resource corresponding to the second object by querying the "getIdentifier" method associated with the second object.

In another example, the transportation resource object (e.g., a truck) may be assigned to a load object. In this case, the "transmitAssignment" may send a message or assignment to a transportation manager or an operator of the transportation resource object that the resource (e.g., the truck) is to be dispatched to transport the load associated with the load object. The "endDrag" method may determine the identifier of the load by querying the "getIdentifier" method associated with the load object, and the "transmitAssignment" method may determine the destination to which the load is to be transported by querying the "getDestination" method associated with the load object.

In an exemplary embodiment, the "transmitAssignment" method may use the "setAvailability" method to set the value of the "Availability" attribute of the transportation resource object to indicate that the resource is unavailable. In an exemplary embodiment, the "transmitAssignment" method may use the "renderTransportationResource" method to update the representation used to represent the object on the user interface. For example, the "renderTransportationResource" method may use the change in the value of the "Availability" attribute to change a color of the representation (e.g., from a green icon to a red icon), a type of the representation, and the like, to represent that the previously available resource has now become unavailable.

FIG. 9 illustrates a block diagram of an exemplary class 900 defined for loads. One of ordinary skill in the art will recognize that any suitable class structure and class components may be used to define loads, and that such class structures and components are not limited to the illustrative embodiment of FIG. 9.

The class 900 may include one or more attributes 902 associated with a load object including, but not limited to, a unique identifier of the load (e.g., Load No. 2342), one or more types of the load (e.g., perishable, non-perishable, hazardous, toxic), the size of the load (e.g., dimensions, volume, weight), the priority level for the transportation of the load (e.g., high priority, medium priority, low priority), the assignment status of the load (e.g., whether the load has already been assigned to a transportation resource for transportation), a vendor of the load if any, the current geographical location of the load (e.g., a periodically updated GPS location, a street location or a descriptive location of the load), a physical destination address for the load (e.g., the GPS location, a street location or a descriptive location of the destination of the load), and the like.

The class 900 may include one or more methods 904 associated with a load object. Exemplary embodiments may provide a code generation module for generating code associated with the methods 904. The code may be executed at run time to perform the functionality encapsulated in the methods 904.

In exemplary embodiments, the class 900 may include one or more "get" methods for obtaining the values of one or more attributes of a class object and one or more "set" methods for setting the values of one or more attributes of a class object. In an exemplary embodiment, a "getIdentifier" method and a "setIdentifier" method may allow obtaining and setting, respectively, the value of the "Identifier" attribute which designates the unique identifier of a load object. A "getType" method and a "setType" method may allow obtaining and setting, respectively, the value of the "Type" attribute which designates one or more types associated with a load object. A "getSize" method and a "setSize" method may allow obtaining and setting, respectively, the value of the "Size" attribute which designates the size, volume and/or weight associated with a load object. A "getPriority" method and a "setPriority" method may allow obtaining and setting, respectively, the value of the "Priority" attribute which designates the priority level for the transportation of a load object. For example, a high priority load object may be assigned for transportation before a lower priority load object. A "getAssignmentStatus" method and a "setAssignmentStatus" method may allow obtaining and setting, respectively, the value of the "AssignmentStatus" attribute which designates whether a load object has been assignment to a transportation resource for transportation. A "getVendor" method and a "setVendor" method may allow obtaining and setting, respectively, the value of the "Vendor" attribute which designates a vendor of a load object. A "getLocation" method and a "setLocation" method may allow obtaining and setting, respectively, the value of the "Location" attribute which designates the current geographical location of a load object. A "getDestination" method and a "setDestination" method may allow obtaining and setting, respectively, the value of the "Destination" attribute which designates a geographical destination location for a load object.

The class 900 may include a "renderLoad" method that visually renders a representation of a load object on a user interface. Exemplary representations may include, but are not limited to, a representation associated with a load object. In exemplary embodiments, the "renderLoad" method may use the "get" methods to obtain the values of one or more attributes, and may use the attribute values in customizing and/or updating the rendering of the representation associated with the load object.

In an exemplary embodiment, the value of the "Identifier" attribute may be rendered on the user interface, for example, as a pop-up component associate with the representation, on the representation directly, and the like. In an exemplary embodiment, the value of the "Type" attribute may be used to customize the representation, for example, a perishable load may be represented using a different representation than a non-perishable load, and the like. In an exemplary embodiment, the value of the "Size" attribute may be used to customize the representation (for example, a very large load may be represented by a larger than usual icon), or may be represented on the user interface, for example, in a pop-up component on the representation, on the representation directly, and the like. In an exemplary embodiment, the value of the "Priority" attribute may be used to customize the representation, for example, a high-priority load may be rendered using a blinking representation or may be highlighted in any other suitable way. In an exemplary embodiment, the value of the "AssignmentStatus" attribute may be used to customize the representation, for example, an unassigned load may be represented in a different color than an assigned load or using a different type of representation than an assigned load. In an exemplary embodiment, the value of the "Vendor" attribute may be rendered on the user interface, for example, as a pop-up component associated with the representation, on the representation directly, and the like.

In an exemplary embodiment, the value of the "Location" attribute may be used to render the load representation at a representation of its current geographical location on a geographical map. The value of the "Location" attribute may be periodically obtained using the getLocation method to update a representation of the current geographical location of a moving load on the map. In an exemplary embodiment, the values of the "Location" attribute and the "Destination" attribute may be used to render a geographical map on the user interface so that representations of both the current location and the destination location of the load are viewable on the same interface by a user. In an exemplary embodiment, the value of the "Destination" attribute may be rendered on the user interface in association with the load representation, for example, as a pop-up component associated with the representation, on the representation directly, and the like.

The class 900 may include a "startDrag" method and an "endDrag" method for tracking, respectively, the start and end of a drag-and-drop user operation in which a representation of a load object is dragged and dropped from one location to another location on a user interface. The "startDrag" method may begin tracking the movement of the load representation on the user interface and its overlap with any other user interface components. The "endDrag" method may end the tracking of the load representation and may determine if the load representation is dropped in an overlapping position with a second component on the user interface. For example, a load representation may be dragged and dropped onto a transportation resource representation to assign the load to the transportation resource. The "endDrag" method may determine a second object and/or a second class associated with the second component. The "endDrag" method may output the identity of the second object associated with the second component to a "matchLoadWithResource" method to match the load object to the second object associated with the second component. The "endDrag" method may determine the identifier of the second object by querying the "getIdentifier" method associated with the second object.

The "matchLoadWithResource" method may match the load object associated with the method to the second object identified by the "endDrag" method. In an exemplary embodiment, the load object may be matched to a transportation resource object (e.g., a truck). In an exemplary embodiment, the "matchLoadWithResource" method may use the "setAvailability" method to set the value of the "AssignmentStatus" attribute of the load object to indicate that the load has been assigned for transportation. In an exemplary embodiment, the "matchLoadWithResource" method may use the "renderLoad" method to update the representation of the load object on the user interface. For example, the "renderLoad" method may use the change in the value of the "AssignmentStatus" attribute to change a color of the representation (e.g., from a green icon to a red icon), a type of the representation, and the like, to represent that the previously unassigned load has been assigned for transportation.

IV. Exemplary Computing Devices

Figure 10:
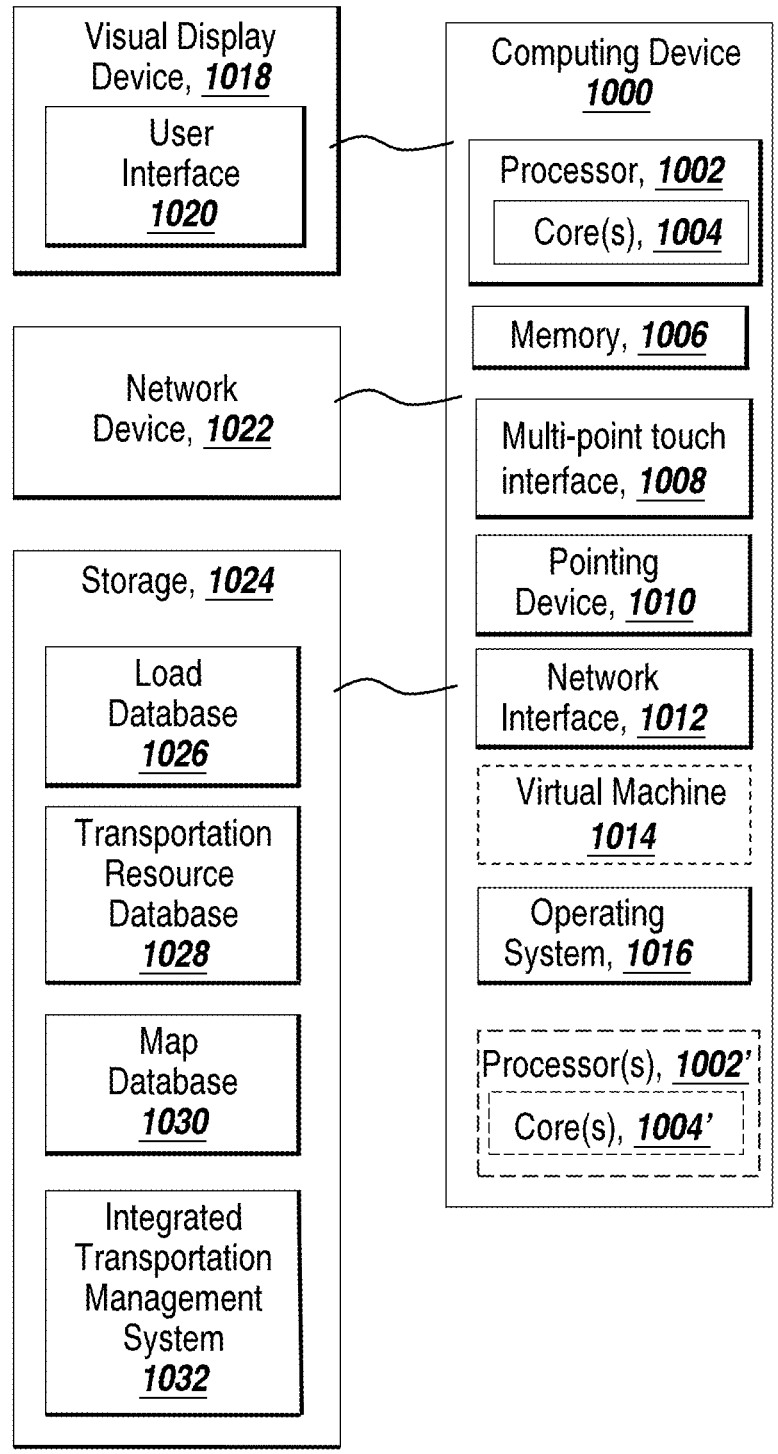
FIG. 10 is a block diagram of an exemplary computing device that may be used to perform any of the exemplary methods disclosed herein.

FIG. 10 is a block diagram of an exemplary computing device 1000 that may be used in to perform any of the methods provided by exemplary embodiments. The computing device 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more USB flashdrives), and the like. For example, memory 1006 included in the computing device 1000 may store computer-readable and computer-executable instructions or software for implementing exemplary embodiments. The computing device 1000 also includes processor 1002 and associated core 1004, and optionally, one or more additional processor(s) 1002' and associated core(s) 1004' (for example, in the case of computer systems having multiple processors/cores), for executing computer-readable and computer-executable instructions or software stored in the memory 1006 and other programs for controlling system hardware. Processor 1002 and processor(s) 1002' may each be a single core processor or multiple core (1004 and 1004') processor.

Virtualization may be employed in the computing device 1000 so that infrastructure and resources in the computing device may be shared dynamically. A virtual machine 1014 may be provided to handle a process running on multiple processors so that the process appears to be using only one computing resource rather than multiple computing resources. Multiple virtual machines may also be used with one processor.

Memory 1006 may include a computer system memory or random access memory, such as DRAM, SRAM, EDO RAM, and the like. Memory 1006 may include other types of memory as well, or combinations thereof.

A user may interact with the computing device 1000 through a visual display device 1018, such as a computer monitor, which may display one or more user interfaces 1020 that may be provided in accordance with exemplary embodiments, for example, the exemplary interfaces illustrated in FIGS. 4 and 7. The visual display device 1018 may also display other aspects, elements and/or information or data associated with exemplary embodiments, for example, views of databases, maps, photos and videos of transportation resources and loads, and the like. The computing device 1000 may include other I/O devices for receiving input from a user, for example, a keyboard or any suitable multi-point touch interface 1008, a pointing device 1010 (e.g., a mouse). The keyboard 1008 and the pointing device 1010 may be coupled to the visual display device 1018. The computing device 1000 may include other suitable conventional I/O peripherals.

The computing device 1000 may also include one or more storage devices 1024, such as a hard-drive, CD-ROM, or other computer readable media, for storing data and computer-readable instructions and/or software that implement exemplary embodiments of an integrated transportation management system 1032 as taught herein. Exemplary storage device 1024 may also store one or more databases for storing any suitable information required to implement exemplary embodiments. The databases may be updated by a user or automatically at any suitable time to add, delete or update one or more items in the databases.

Exemplary storage device 1024 may store one or more load databases 1026 for storing information on loads, e.g., loads that need to be procured, loads that need to be shipped, and the like. Load database 1026 may also include information on each load including, but not limited to, the weight and/or volume of the load, the geographical location of the load, the type of geographical location at which the load is located (e.g., vendor location, a store location or a storage location), the geographical destination location for the load, the status of the load (e.g., whether the load is waiting for pick-up, is in transit, or has been delivered), the type of the load (e.g., whether the load is dry or perishable), the amount of time that the load has been waiting for transportation, the priority status of the load (e.g., high priority for medications), and the like.

Exemplary storage device 1024 may store one or more transportation resource databases 1028 for storing information on transportation resources that may be used in transporting loads, e.g., vehicles, drivers, and the like. Transportation resource database 1028 may also include information on each transportation resource including, but not limited to, the capacity of the resource (e.g., the weight or volume capacity of a truck, the work hours of a driver), the geographical location of the resource, the status of the resource (e.g., whether a truck or driver is available or is in transit), the type of the resource (e.g., whether a truck is refrigerated), and the like.

Exemplary storage device 1024 may store one or more map databases 1030 for storing any suitable maps or mapping information on one or more geographical areas throughout which transportation operations may be performed. Map database 1030 may also include additional information including, but not limited to, the geographical distribution of loads and/or transportation resources throughout the area, traffic information, weather information, and the like.

The computing device 1000 may include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. The network interface 1012 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein. Moreover, the computing device 1000 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 1000 may run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1016 may be run in native mode or emulated mode. In an exemplary embodiment, the operating system 1016 may be run on one or more cloud machine instances.

V. Exemplary Network Environments

Figure 11:
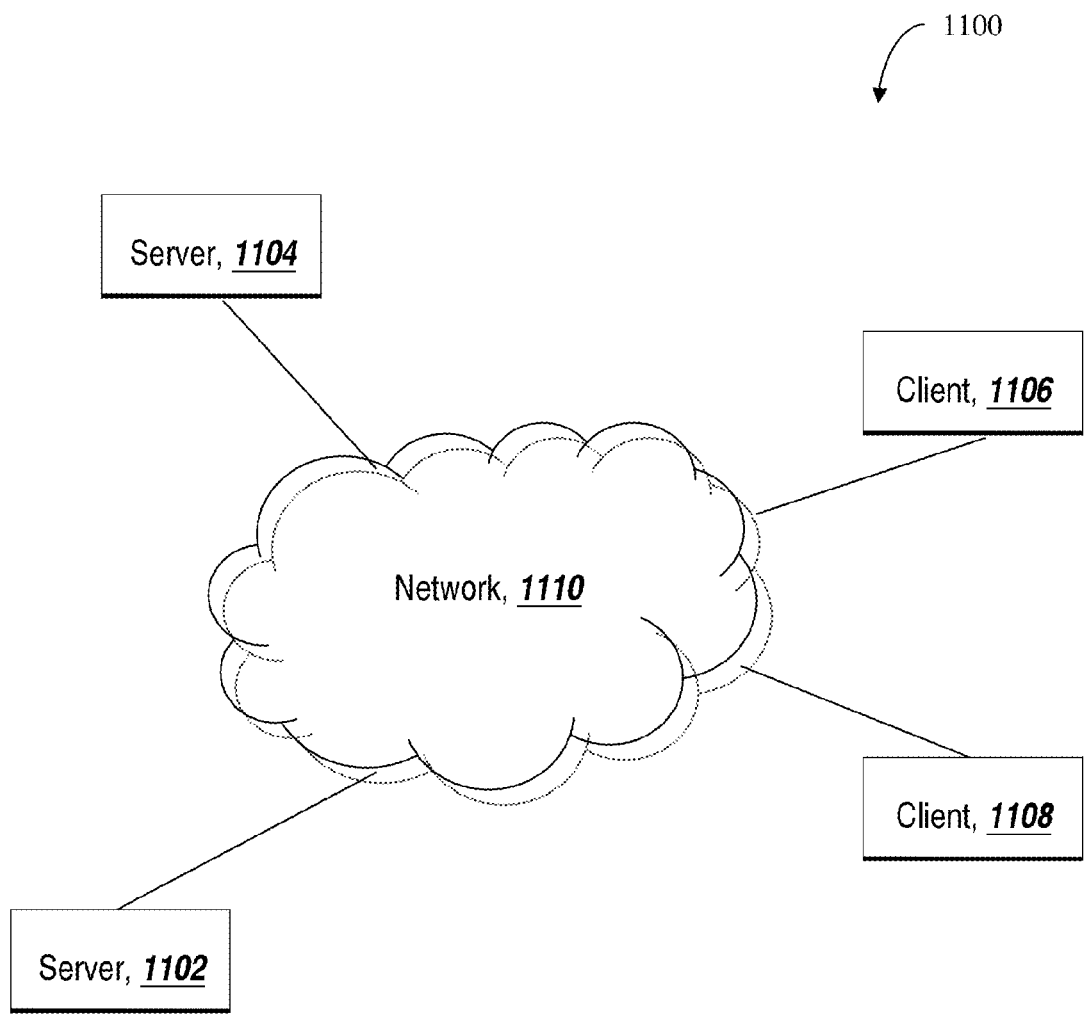
FIG. 11 is a diagram of an exemplary network environment suitable for a distributed implementation of exemplary embodiments.

FIG. 11 is a diagram of an exemplary network environment 1100 suitable for a distributed implementation of exemplary embodiments. The network environment 1100 may include one or more servers 1102 and 1104 coupled to one or more clients 1106 and 1108 via a communication network 1110. The network interface 1012 and the network device 1022 of the computing device 1000 enable the servers 1102 and 1104 to communicate with the clients 1106 and 1108 via the communication network 1110. The communication network 1110 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 1110 are capable of supporting distributed implementations of exemplary embodiments.

In an exemplary embodiment, the servers 1102 and 1104 may provide the clients 1106 and 1108 with computer-readable and/or computer-executable components or products under a particular condition, such as a license agreement. The computer-readable and/or computer-executable components or products may include those for providing and rendering an exemplary transportation resource management user interface. The clients 1106 and 1108 may provide and render an exemplary graphical user interface using the computer-readable and/or computer-executable components and products provided by the servers 1102 and 1104. In an exemplary embodiment, the clients 1106 and 1108 may transmit information on a transportation operation defined by the user using the user interface to the servers 1102 and 1104 that may, in turn, automatically execute the transportation operation.

Alternatively, in another exemplary embodiment, the clients 1106 and 1108 may provide the servers 1102 and 1104 with computer-readable and computer-executable components or products under a particular condition, such as a license agreement. The computer-readable and computer-executable components or products may include those for providing and rendering an exemplary integrated transportation resource management user interface. For example, in an exemplary embodiment, the servers 1102 and 1104 may provide and render an exemplary graphical user interface using the computer-readable and/or computer-executable components and products provided by the clients 1106 and 1108. In an exemplary embodiment, the servers 1102 and 1104 may transmit information on a transportation operation defined by the user using the user interface to the clients 1106 and 1108 that may, in turn, automatically execute the transportation operation.

VI. Equivalents

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. In a computational transportation resource management system, a method for configuring a graphical user interface for management of transportation resources, the method comprising:

constructing a query to request information associated with one or more transportation resources and one or more loads in a geographic region from one or more databases;

programmatically rendering a map of the geographical region on the graphical user interface in the computational transportation resource management system;

programmatically populating the map with graphical representations of a set of one or more available transportation resources at representations of current geographical locations of the one or more transportation resources based on the information associated with the one or more transportation resources, each of the representations of a set of one or more available transportation resources associated with one or more data structures including one or more functions and one or more attributes;

programmatically populating the map with graphical representations of one or more unassigned loads at representations of current geographical locations of the one or more loads based on the information associated with the one or more loads, each of the representations of a set of one or more unassigned loads associated with one or more data structures including one or more functions and one or more attributes, the one or more attributes including a size or a type of the one or more loads;

receiving user input selecting, directly on the map, graphical representations of a first set of one or more loads;

executing the one or more functions included in the one or more data structures to evaluate the one or more attributes associated with the selected first set of one or more loads and the one or more attributes associated with the available transportation resources;

in response to evaluating the one or more attributes, automatically reconfiguring the graphical user interface by execution of the one or more functions to refine the graphical representations of the set of transportation resources rendered on the map by populating the map with a subset of the set of transportation resources suitable for transporting the selected first set of loads;

receiving user input selecting, directly on the map, graphical representations of a first set of one or more transportation resources and graphical representations of the first set of one or more loads,
wherein two or more transportation resources from the first set of one or more transportation resources are combined in response to user input selecting graphical representations of the first set of one or more transportation resources to create a combined transportation resource for assignment to one of the selected first sets of loads;
determining that the two or more transportation resources forming the combined transportation resource are incompatible for combination;
executing code to display an error message in the graphical user interface in response to determining that the two or more transportation resources forming the combined transportation resource are incompatible for combination;
receiving user input selecting, directly on the map, graphical representations of a second set of one or more transportation resources wherein two or more transportation resources from the second set of one or more transportation resources are combined in response to user input selecting graphical representations of the two or more transportation resources from the second set of one or more transportation resources;
determining that the two or more transportation resources from the second set of one or more transportation resources forming the combined transportation resource are compatible for combination;
receiving user input selecting, directly on the map, graphical representations of the second set of one or more transportation resource and dragging and dropping the selected graphical representations of the second set of one or more transportation resources onto graphical representations of the first set of one or more loads;
executing code to generate one or more combined graphical representations, on the map, replacing the graphical representations of the second set of one or more transportation resources and the first set of one or more loads, the one or more combined graphical representations indicating one or more transportation operations in which the selected second set of one or more transportation resources is assigned to transport the first set of one or more loads from one or more geographical pickup locations to one or more geographical destination locations; and
executing code to perform the one or more transportation operations based on the user input on the graphical user interface.

2. The method of claim 1, further comprising:
automatically updating the current geographical locations of the one or more transportation resources and the one or more loads on the map.

3. The method of claim 1, further comprising, upon definition of the transportation operation in which the first set of transportation resources is assigned to transport the first set of loads:
automatically updating a status of the first set of transportation resources to indicate that the first set of transportation resources is unavailable; and
automatically updating a status of the first set of loads to indicate that the first set of loads is assigned for transportation.

4. The method of claim 1, further comprising:
upon selection of the first set of transportation resources, automatically recommending the first set of loads suitable for transportation using the first set of transportation resources.

5. The method of claim 4, wherein the first set of loads is recommended based on the current geographical locations of the first set of transportation resources.

6. The method of claim 4, wherein the first set of loads is recommended based on a type, a volume capacity and/or a size capacity of the first set of transportation resources.

7. The method of claim 1, further comprising:
upon selection of the first set of loads, automatically recommending the first set of transportation resources suitable for transporting the first set of loads.

8. The method of claim 7, wherein the first set of transportation resources is recommended based on the current geographical locations and/or the geographical destination locations of the first set of loads.

9. The method of claim 7, wherein the first set of transportation resources is recommended based on a type, a volume and/or a size of the first set of loads.

10. The method of claim 1, wherein performance of the transportation operation comprises:
transmitting a message to a transportation management entity to transport the first set of loads using the first set of transportation resources to the one or more destination addresses.

11. The method of claim 1, wherein defining the transportation operation comprises:
dragging and dropping, on the map, representations of the first set of loads onto representations of the first set of transportation resources.

12. The method of claim 1, further comprising:
receiving user input selecting, directly on the map, representations of the one or more geographical destination locations for transporting the first set of loads.

13. The method of claim 1, wherein two or more of the transportation resources are represented on the map using different types of representations and/or different colored representations.

14. The method of claim 1, wherein two or more of the loads are represented on the map using different types of representations and/or different colored representations.

15. The method of claim 1, wherein the information from the one or more databases includes at least one of GPS information, GIS information, traffic conditions, weather conditions, type of transportation resource, size of transportation resource, availability status, operator information, type of load, size of load, priority level, assignment status, or vendor identification.

16. The method of claim 1, wherein the size of the load includes a dimension of the load, a volume of the load, or a weight of the load, and the type of the load includes a perishable load, a non-perishable load, a hazardous load, or a toxic load.

17. The method of claim 1, further comprising:
receiving user input selecting, directly on the map, the one or more combined graphical representations and dragging and dropping the selected one or more combined graphical representations onto a graphical representation of the one or more geographical destination locations.

18. A computational transportation resource management system for configuring a graphical user interface for management of transportation resources, the system comprising:

a display device for displaying the graphical user interface; and a processor programmed to:

construct a query to request information associated with one or more transportation resources and one or more loads in a geographic region from one or more databases, render a map of the geographical region, populate graphical representations of one or more available transportation resources on the map at representations of current geographical locations of the one or more transportation resources based on the information associated with the one or more transportation resources, each of the representations of a set of one or more available transportation resources associated with one or more data structures including one or more functions and one or more attributes, populate graphical representations of one or more unassigned loads on the map at representations of current geographical locations of the one or more loads based on the information associated with the one or more loads, each of the representations of a set of one or more the unassigned loads associated with one or more data structures including one or more functions and one or more attributes, the one or more attributes including a size or a type of the one or more loads, receive user input selecting, directly on the map, graphical representations of a first set of one or more loads, execute the one or more functions included in the one or more data structures to evaluate the one or more attributes associated with the selected first set of one or more loads and the one or more attributes associated with the available transportation resources, automatically reconfigure the graphical user interface by execution of the one or more functions to refine the representations of the set of transportation resources rendered on the map in response to evaluation of the one or more attributes by populating the map with a subset of the set of transportations resources suitable for transporting the first set of loads, receive user input selecting, directly on the map, graphical representations of a first set of one or more transportation resources and graphical representations of the first set of one or more loads, wherein two or more transportation resources from the first set of one or more transportation resources are combined in response to user input selecting graphical representations of the first set of one or more transportation resources to create a combined transportation resource for assignment to one of the selected first sets of loads, determine that the two or more transportation resources forming the combined transportation resource are incompatible for combination, execute code to display an error message in the graphical user interface in response to determining that the two or more transportation resources forming the combined transportation resource are incompatible for combination, receive user input selecting, directly on the map, graphical representations of the first set of one or more transportation resources wherein two or more transportation resources from the first set of one or more transportation resources are combined in response to user input selecting graphical representations of the two or more transportation resources, determine that the two or more transportation resources forming the combined transportation resource are compatible for combination, receive user input selecting, directly on the map, graphical representations of the second set of one or more transportation resource and dragging and dropping the selected graphical representations of the second set of one or more transportation resources onto graphical representations of the first set of one or more loads, execute code to generate one or more combined graphical representations, on the map, replacing the graphical representations of the second set of one or more transportation resources and the first set of one or more loads, the one or more combined graphical representations indicating one or more transportation operations in which the selected second set of one or more transportation resources is assigned to transport the first set of one or more loads from one or more geographical pickup locations to one or more geographical destination locations, and execute code to perform the one or more transportation operations based on the user input on the graphical user interface.

19. The computer system of claim 18, wherein the processor is further programmed to:

automatically update, on the map, the current geographical locations of the one or more transportation resources and the one or more loads.

20. The computer system of claim 18, wherein the processor is further programmed to, upon definition of the transportation operation in which the first set of transportation resources is assigned to transport the first set of loads:

automatically update a status of the first set of transportation resources to indicate that the first set of transportation resources is unavailable; and automatically update a status of the first set of loads to indicate that the first set of loads is assigned for transportation.

21. The computer system of claim 18, wherein the processor is further programmed to:

upon selection of the representations of the first set of transportation resources, automatically recommend the first set of loads suitable for transportation using the first set of transportation resources.

22. The computer system of claim 21, wherein the first set of loads is recommended based on the current geographical locations of the first set of transportation resources.

23. The computer system of claim 21, wherein the first set of loads is recommended based on a type, a volume capacity and/or a size capacity of the first set of transportation resources.

24. The computer system of claim 18, wherein the processor is further programmed to:

upon selection of the first set of loads, automatically recommend the first set of transportation resources suitable for transporting the first set of loads.

25. The computer system of claim 24, wherein the first set of transportation resources is recommended based on the current geographical locations and/or the geographical destination location of the first set of loads.

26. The computer system of claim 24, wherein the first set of transportation resources is recommended based on a type, a volume and/or a size of the first set of loads.

27. The computer system of claim 18, wherein performance of the transportation operation comprises:
transmitting a message to a transportation management entity to transport the first set of loads using the first set of transportation resources to the destination address.

28. The computer system of claim 18, wherein defining the transportation operation comprises:
dragging and dropping, on the map, representations of the first set of loads onto the representations of the first set of transportation resources.

29. The computer system of claim 18, wherein the processor is further programmed to:
receive user input selecting, directly on the map, a representation of the geographical destination location for the first set of loads.

30. The computer system of claim 18, wherein two or more of the transportation resources are represented on the map using different types of representations and/or different colored representations.

31. The computer system of claim 18, wherein two or more of the loads are represented on the map using different types of representations and/or different colored representations.

32. In a computational transportation resource management system, one or more non-transitory computer-readable media storing computer-executable instructions for performing a method for configuring a graphical user interface for management of transportation resources, the method comprising:
constructing a query to request information associated with one or more transportation resources and one or more loads in a geographic region from one or more databases;
programmatically rendering a map of the geographical region on the graphical user interface in the computational transportation resource management system;
programmatically populating the map with graphical representations of a set of one or more available transportation resources at representations of current geographical locations of the one or more transportation resources based on the information associated with the one or more transportation resources, each of the representations of a set of one or more available transportation resources associated with one or more data structures including one or more functions and one or more attributes;
programmatically populating the map with graphical representations of one or more unassigned loads at representations of current geographical locations of the one or more loads based on the information associated with the one or more loads, each of the representations of a set of one or more unassigned loads associated with one or more data structures including one or more functions and one or more attributes, the one or more attributes including a size or a type of the one or more loads;
receiving user input selecting, directly on the map, graphical representations of a first set of one or more loads;
executing the one or more functions included in the one or more data structures to evaluate the one or more attributes associated with the selected first set of one or more loads and the one or more attributes associated with the available transportation resources;
in response to evaluating the one or more attributes, automatically reconfiguring the graphical user interface by execution of the one or more functions to refine the graphical representations of the set of transportation resources rendered on the map by populating the map with a subset of the set of transportations resources suitable for transporting the selected first set of loads;
receiving user input selecting, directly on the map, graphical representations of a first set of one or more transportation resources and graphical representations of the first set of one or more loads,
wherein two or more transportation resources from the first set of one or more transportation resources are combined in response to user input selecting graphical representations of the first set of one or more transportation resources to create a combined transportation resource for assignment to one of the selected first sets of loads,
determining that the two or more transportation resources forming the combined transportation resource are incompatible for combination,
executing code to display an error message in the graphical user interface in response to determining that the two or more transportation resources forming the combined transportation resource are incompatible for combination,
receiving user input selecting, directly on the map, graphical representations of the first set of one or more transportation resources wherein two or more transportation resources from the first set of one or more transportation resources are combined in response to user input selecting graphical representations of the two or more transportation resources,
determining that the two or more transportation resources forming the combined transportation resource are compatible for combination,
receiving user input selecting, directly on the map, graphical representations of the second set of one or more transportation resource and dragging and dropping the selected graphical representations of the second set of one or more transportation resources onto graphical representations of the first set of one or more loads;
executing code to generate one or more combined graphical representations, on the map, replacing the graphical representations of the second set of one or more transportation resources and the first set of one or more loads, the one or more combined graphical representations indicating one or more transportation operations in which the selected second set of one or more transportation resources is assigned to transport the first set of one or more loads from one or more geographical pickup locations to one or more geographical destination locations; and
executing code to perform the one or more transportation operations based on the user input on the graphical user interface.

33. The one or more non-transitory computer-readable media of claim 32, wherein the method further comprises:
automatically updating the current geographical locations of the one or more transportation resources and the one or more loads on the map.

34. The one or more non-transitory computer-readable media of claim 32, wherein the method further comprises, upon definition of the transportation operation in which the first set of transportation resources is assigned to transport the first set of loads:
automatically updating a status of the first set of transportation resources to indicate that the first set of transportation resources is unavailable; and
automatically updating a status of the first set of loads to indicate that the first set of loads is assigned for transportation.

35. The one or more non-transitory computer-readable media of claim 32, wherein the method further comprises:
upon selection of the first set of transportation resources, automatically recommending the first set of loads suitable for transportation using the first set of transportation resources.

36. The one or more non-transitory computer-readable media of claim 35, wherein the first set of loads is recommended based on the current geographical locations of the first set of transportation resources.

37. The one or more non-transitory computer-readable media of claim 35, wherein the first set of loads is recommended based on a type, a volume capacity and/or a size capacity of the first set of transportation resources.

38. The one or more non-transitory computer-readable media of claim 32, wherein the method further comprises:
upon selection of the first set of loads, automatically recommending the first set of transportation resources suitable for transporting the first set of loads.

39. The one or more non-transitory computer-readable media of claim 38, wherein the first set of transportation resources is recommended based on the current geographical locations and/or the one or more geographical destination locations of the first set of loads.

40. The one or more non-transitory computer-readable media of claim 38, wherein the first set of transportation resources is recommended based on a type, a volume and/or a size of the first set of loads.

41. The one or more non-transitory computer-readable media of claim 35, wherein performance of the transportation operation comprises:
transmitting a message to a transportation management entity to transport the first set of loads using the first set of transportation resources to the one or more destination addresses.

42. The one or more non-transitory computer-readable media of claim 35, wherein defining the transportation operation comprises:
dragging and dropping, on the map, representations of the first set of loads onto representations of the first set of transportation resources.

43. The one or more non-transitory computer-readable media of claim 35, wherein the method further comprises:
receiving user input selecting, directly on the map, representations of the one or more geographical destination locations for transporting the first set of loads.

44. The one or more non-transitory computer-readable media of claim 35, wherein two or more of the transportation resources are represented on the map using different types of representations and/or different colored representations.

45. The one or more non-transitory computer-readable media of claim 35, wherein two or more of the loads are represented on the map using different types of representations and/or different colored representations.

* * * * *